United States Patent
Bonavides

(10) Patent No.: US 8,952,574 B2
(45) Date of Patent: Feb. 10, 2015

(54) SAFELY DEPLOYING POWER

(75) Inventor: Clovis Satyro Bonavides, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/119,335

(22) PCT Filed: Apr. 27, 2012

(86) PCT No.: PCT/US2012/035338

§ 371 (c)(1),
(2), (4) Date: Nov. 21, 2013

(87) PCT Pub. No.: WO2012/166269

PCT Pub. Date: Dec. 6, 2012

(65) Prior Publication Data

US 2014/0111025 A1   Apr. 24, 2014

Related U.S. Application Data

(63) Continuation-in-part of application No. PCT/US2011/055729, filed on Oct. 11, 2011, which is a continuation-in-part of application No. PCT/US2011/038900, filed on Jun. 2, 2011.

(51) Int. Cl.
*H02J 4/00* (2006.01)
(52) U.S. Cl.
CPC ............................... *H02J 4/00* (2013.01)
USPC .................................. 307/113; 307/115
(58) Field of Classification Search
CPC ................................................ E21B 43/1185
USPC .................................................. 307/113, 115
See application file for complete search history.

(56) References Cited

U.S. PATENT DOCUMENTS 2,344,173 A    3/1944   Ruge
3,168,141 A    2/1965   Lebourg
(Continued)

FOREIGN PATENT DOCUMENTS

DE    G89C3566.6    10/1989
EP    0144660 A1    6/1985

OTHER PUBLICATIONS

International Preliminary Examining Authority, International Preliminary Report on Patentability in PCT/US11/38900, Jun. 6, 2013.
(Continued)

*Primary Examiner* — Fritz M Fleming
(74) *Attorney, Agent, or Firm* — Howard L. Speight, PLLC

(57) ABSTRACT

A first-switch-actuation-polarity power is applied to a first-switch actuation line, the first polarity being defined relative to a first voltage on a first-switch-actuation-enable line, causing the first switch to actuate and remain actuated after the applied first-switch-actuation-polarity power is removed. Actuating the first switch couples a first-switch power input line to a first-switch power output line and the first-switch power input line to the first-switch enable line. The first-switch enable line is coupled to a second-switch actuation enable line on a second switch. Second-switch-actuation polarity power is applied to the second-switch actuation line on the second switch, the second polarity being defined relative to a voltage on the second-switch actuation enable line and being opposite of the first polarity, causing the second switch to actuate and remain actuated after the applied second-switch-actuation-polarity power is removed and coupling a second-switch power input line to a second-switch power output line.

20 Claims, 16 Drawing Sheets

(56) References Cited

U.S. PATENT DOCUMENTS

| | | | |
|---|---|---|---|
| 3,309,481 | A | 3/1967 | Merrill |
| 3,676,945 | A | 7/1972 | Neanhouse |
| 3,717,095 | A | 2/1973 | Vann |
| 4,099,818 | A | 7/1978 | Meinzer |
| 4,151,383 | A | 4/1979 | Miyata |
| 4,927,988 | A | 5/1990 | Nolte |
| 5,105,742 | A | 4/1992 | Sumner |
| 5,115,865 | A | 5/1992 | Carisella et al. |
| 5,839,508 | A | 11/1998 | Tubel et al. |
| 5,908,365 | A | 6/1999 | Lajaunie et al. |
| 5,967,297 | A | 10/1999 | Kaufman et al. |
| 6,070,672 | A | 6/2000 | Gazda |
| 7,387,162 | B2 | 6/2008 | Mooney, Jr. et al. |
| 2001/0027864 | A1 | 10/2001 | Vaynshteyn |
| 2003/0213595 | A1 | 11/2003 | Jackson |
| 2014/0091893 | A1* | 4/2014 | Bonavides et al. ............... 337/4 |
| 2014/0185178 | A1* | 7/2014 | Bonavides ................... 361/115 |

OTHER PUBLICATIONS

International Preliminary Examining Authority, International Preliminary Report on Patentability in PCT/US2011/055729, Jun. 28, 2013.

International Preliminary Examining Authority, International Preliminary Report on Patentability in PCT/US2012/035338, Oct. 4, 2013.

International Searching Authority, International Search Report and the Written Opinion of the International Searching Authority in PCT/US2011/055729, Mar. 2, 2012.

International Searching Authority, International Search Report and the Written Opinion of the International Searching Authority in PCT/US2012/035338, Aug. 30, 2012.

International Searching Authority, International Search Report and the Written Opinion of the International Searching Authority in PCT/US2011/038900, Oct. 7, 2011.

Australian Government IP Australia, Patent Examination Report No. 1, Patent Application No. 2013274760, Nov. 10, 2014.

European Patent Office, European Patent Publication, Electrical Connection Device, such as a Socket-Outlet, for Electrical Power-Consuming Devices, Publication Date: Jun. 19, 1985 which is a translation of EP0144660.

European Patent Office, European Search Report, Application No./Patent No. 11866905.0-1808/2697811 PCT/US2011055729 (which is the EP counterpart of a US matter (U.S. Appl. No. 14/119,310) that is related to the instant application), Oct. 28, 2014.

Federal Republic of Germany, German Patent Office, Electrical Switch, Publication date: Oct. 26, 1989 which is a translation of Gebrauchsmuster DE G C3 566.6.

* cited by examiner

SAFELY DEPLOYING POWER

CROSS-REFERENCE TO RELATED APPLICATIONS

This application is a United States national phase application claiming priority to International Application No. PCT/US2012/035338, entitled "Safely Deploying Power," filed on Apr. 27, 2012, to International Application No. PCT/US2011/055729, entitled "Changing the State of a Switch Through the Application of Power," filed on Oct. 11, 2011, and International Application No. PCT/US2011/038900, entitled "Changing the State of a Switch Through the Application of Power," filed on Jun. 2, 2011.

BACKGROUND

In some environments, such as in some downhole oil field environments, electrical power contains electrical transients. Some equipment in such environments may be damaged or prematurely triggered by such transients. Safely deploying power to such devices in such an environment is a challenge.

DETAILED DESCRIPTION

Figure 1:
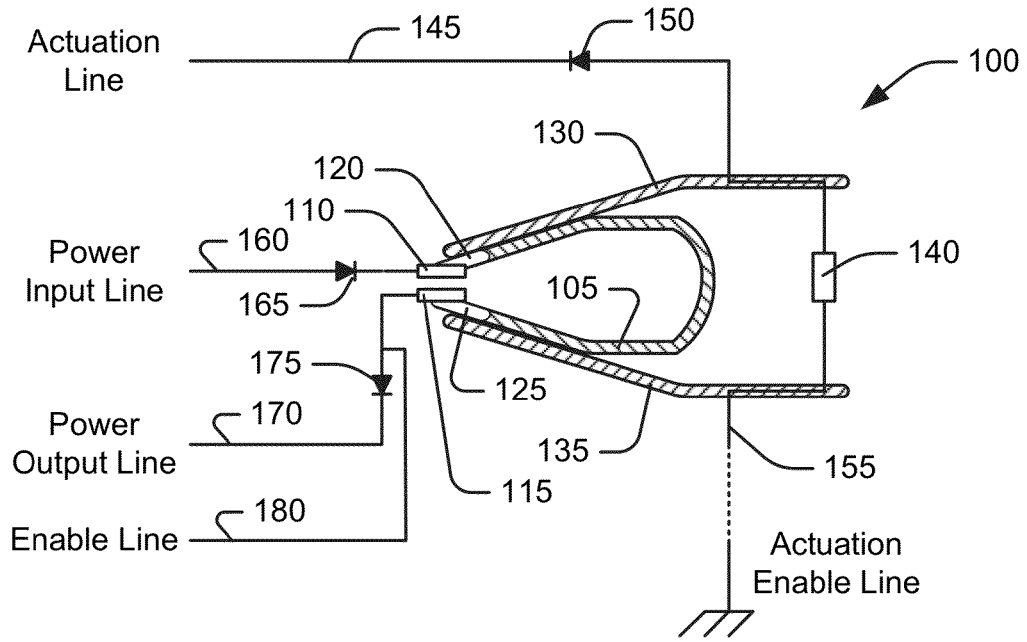
FIGS. 1-14 illustrate deployment switches and aspects thereof.

In one embodiment illustrated in FIG. 1, a deployment switch 100 includes a state-change mechanism that is actuated by dissipating power across a collapsing element. In one embodiment, the word "actuate" as applied to the state change mechanism is defined to mean that heat generated by the collapsing element triggers the state-change mechanism, causing the collapsing element to collapse or causing another element, such as a tie-wrap or an eutectic substance, to collapse or change physical state and to become significantly weak in a structural sense.

In one embodiment, the deployment switch 100 includes a C-shaped spring 105. In one embodiment, the spring 105 is mechanically coupled to a first contact 110 and a second contact 115. In one embodiment, portions of the spring, 120 and 125, adjacent to the first contact 110 and the second contact 115 are non-conductive to electricity. In one embodiment, the spring 105 is made of an elastic material such as steel. In one embodiment, in its non-deformed shape, the spring 105 closes more than is shown in FIG. 1 such that the first contact 110 and second contact 115 come into contact with each other and form a good electrical connection.

In one embodiment, the deployment switch 100 includes two handles or tension elements 130 and 135. In one embodiment, the handles 130 and 135 are made of a material that is non-conductive to electricity, such as plastic. In one embodiment, the handles 130 and 135 are mechanically coupled to the spring 105. In one embodiment, the handles 130, 135 are mechanically coupled to and held in the position shown in FIG. 1 by a collapsing element 140. That is, in one embodiment, the handles 130 and 135 are urged toward each other to the position shown in FIG. 1 and then the collapsing element 140 is mechanically affixed to the handles 130, 135 to hold them in place, which in turn deforms the spring 105 as shown in FIG. 1. In one embodiment, the spring 105 tends to urge the handles 130 and 135 away from each other such that when the deployment switch 100 is in the state shown in FIG. 1, the collapsing element 140 is under mechanical stress. In one embodiment (not shown), the spring is a leaf spring fixed at a proximal end to a post. In one embodiment, the leaf spring is held in tension by a collapsing element, similar to collapsing element 140, so that its distal end is in electrical contact with a normally-closed contact. In one embodiment, when the collapsing element collapses structurally the distal end of the spring breaks electrical contact with the normally-closed contact and makes an electrical connection with a normally-open contact. In one embodiment, the word "actuate" as it is applied to a deployment switch, such as deployment switches 100, 1510, and 1515 (described below in the description of FIGS. 15 and 16), is defined to mean the process described in the preceding sentence.

In one embodiment, the collapsing element 140 is coupled to an "actuation" line 145 through a diode 150 and to a ground line 155.

In one embodiment, the first contact 110 is coupled to a "power input" line 160 through a diode 165. In one embodiment, contact 115 is coupled to a "power output" line 170 through a diode 175. In one embodiment, diode 175 is optional but is recommended for the safety of the deployment switch 100.

In one embodiment, an "enable" line 180 can be used to chain deployment switches together, as described below in FIGS. 15-21.

Figure 2:
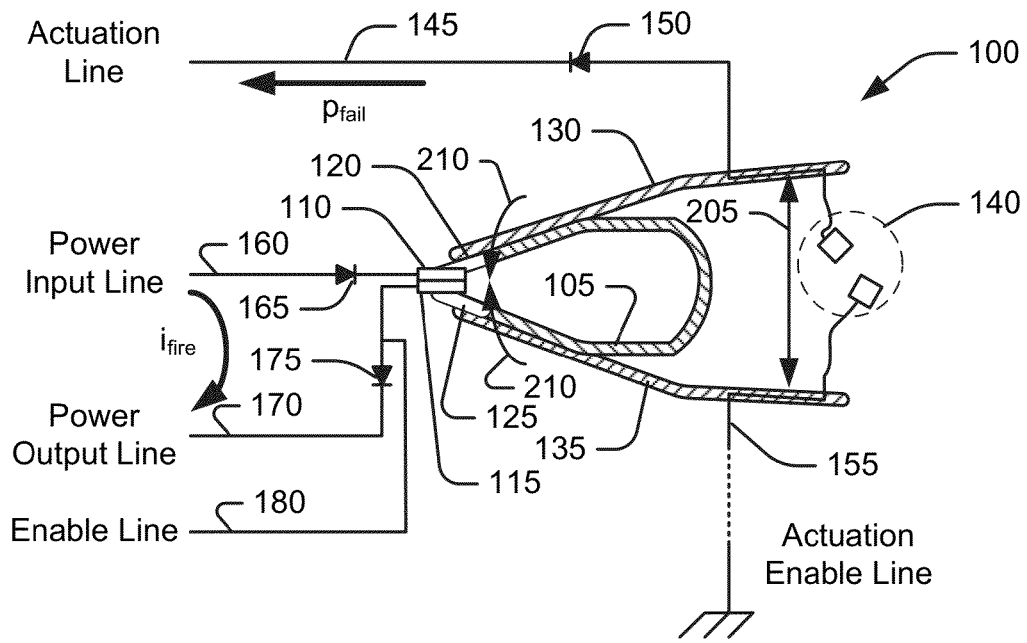

In one embodiment, as shown in FIG. 2, a power $p_{fail}$, shown by an arrow that reflects the polarity of the power $p_{fail}$, is applied to the collapsing element 100 where power $p_{fail}$ is sufficient to cause collapsing element 140 to collapse structurally, as indicated by the two broken parts in the circle designated 140 in FIG. 2.

For example, in one embodiment, the collapsing element 140 is a resistor. In one embodiment, the collapsing element 140 is a resistor rated at ⅛ Watt that collapses structurally (e.g., explodes) if it is exposed to 1 Watt of power. In that case, if the voltage across the resistor collapsing element 140 is 200 volts and the current flowing through the resistor collapsing element 140 is 5 milliamps, the resistor 140 is being exposed to more than 1 Watt (200 volts×5 milliamps) and the resistor 140 will fail by, for example, exploding. In one embodiment, the collapsing element 140 is a resistor rated at less than ⅛ Watt and a resistance between 0.1 and 2 Ohms. In one embodiment, the resistance of the collapsing element 140 is low relative to the upstream resistance on the actuation line 145 (i.e., the resistance of the actuation line 145 to the left of the circuitry shown in FIGS. 1 and 2 with which the collapsing element 140 forms a voltage divider) so that the voltage drop across the collapsing element 140 remains low. That voltage drop is kept low because in some configurations the voltage across the collapsing element is applied to, for example, a detonator and it is desired that the collapsing element 140 collapse before the detonator detonates. In one embodiment, other low voltage barriers (diode 175 is an example) are provided to keep the voltage across the detonator low until the collapsing element 140 collapses. In one embodiment, the collapsing element 140 is a resistor rated at less than ¼ Watt. In one embodiment, the collapsing element 140 is a resistor rated at less than ½ Watt. In one embodiment, the collapsing element is a resistor with a resistance between 0.1 and 5 Ohms. In one embodiment, the collapsing element is a resistor with a resistance between 0.1 and 10 Ohms.

In one embodiment, the collapsing element 140 is a wirewound resistor. In one embodiment the collapsing element 140 is a wirewound resistor made of nickel-chromium wire wrapped around a core.

In one embodiment, the collapsing element 140 is a capacitor that is destroyed by the application of power of a sufficient magnitude and a "wrong" polarity. In one embodiment, the application of power $p_{fail}$ destroys the electrolytic capacitor. In one embodiment, the collapsing element 140 is a low voltage-rated tantalum capacitor. In one embodiment, the collapsing element 140 is a tantalum capacitor rated at less than 2 volts. In one embodiment, the collapsing element 140 is a tantalum capacitor rated at less than 5 volts. In one embodiment, the collapsing element 140 is a tantalum capacitor rated at less than 10 volts. In one embodiment, the collapsing element 140 is a tantalum capacitor having a capacitance less than 1 microfarad. In one embodiment, the collapsing element 140 is a tantalum capacitor having a capacitance less than 10 microfarads. In one embodiment, the collapsing element 140 is a tantalum capacitor having a capacitance less than 100 microfarads.

In one embodiment, the collapsing element 140 is an electromagnetic choke with a magnetic core that fails catastrophically upon the application of excessive power $p_{fail}$. In one embodiment, the collapsing element 140 is an electromagnetic choke rated to carry less than 1 milliamp. In one embodiment, the collapsing element 140 is an electromagnetic choke rated to carry less than 10 milliamps. In one embodiment, the collapsing element 140 is an electromagnetic choke rated to carry less than 100 milliamps. In one embodiment, the collapsing element 140 is an electromagnetic choke having an inductance of less than 10 nanoHenrys. In one embodiment, the collapsing element 140 is an electromagnetic choke having an inductance of less than 100 nanoHenrys. In one embodiment, the collapsing element 140 is an electromagnetic choke having an inductance of less than 1 microHenry.

In one embodiment, the collapsing element 140 is a signal diode. In one embodiment, the collapsing element is a signal diode rated to carry an average rectified forward current of 0.15 amps. In one embodiment, the collapsing element is a signal diode rated to carry an average rectified forward current of 0.3 amps. In one embodiment, the collapsing element is a signal diode rated to carry an average rectified forward current of 0.5 amps.

In one embodiment, the collapsing element 140 (and collapsing element 720, described below) is permanently collapsible, which is defined to mean that the collapsing element 140 does not recover or regain its ability to carry current or hold handles 130 and 135 in the position shown in FIG. 1 after its collapse. In one embodiment, the collapsing element 140 is destroyed when it collapses.

Persons of ordinary skill would recognize that the collapsing element 140 could be made from other components, such as semiconductors, etc., or an arrangement thereof, that structurally collapse under the application of electrical power. Persons of ordinary skill will also recognize that the components shown in FIGS. 1 and 2 (and the components shown in the remaining figures of this application) and the provision of additional protective voltage barriers (such as traditional diodes, Zener diodes, or spark gaps) are selected in light of the circuitry in which the deployment switches 100, 1510, and 1515 (described below in the description of FIGS. 15 and 16) will be operating. Further, in all embodiments, the spring 105 (shown in FIGS. 1-6, 15, and 16) and 705 (shown in FIGS. 7-14) encourage and enhance the collapsing action (shown in FIGS. 2, 4, 9 and 13) of the collapsing elements 140 (shown in FIGS. 1-6, 15, and 16) and 720 (shown in FIGS. 7, 9, 11, and 13).

As mentioned above, when the deployment switch 100 is in the state shown in FIG. 1, the collapsing element 140 is under stress and the spring 105 urges the handles 130 and 135 apart. In one embodiment, when the collapsing element 140 fails, as shown in FIG. 2, the handles 130 and 135 move apart as indicated by the arrow 205 and the spring 105 moves as shown by the arrows 210. In one embodiment, the movement of the spring 105 causes the first contact 110 to come into contact with the second contact 115, closing a circuit between the power input line 160 and the power output line 170 through diodes 165 and 175, which allows a current $i_{fire}$ to flow in the direction shown by the arrow in FIG. 2. In one embodiment, the word "actuate" as it is applied to a deployment switch, such as deployment switches 100, 1510, and 1515 (described below in the description of FIGS. 15 and 16), is defined to mean the process described in the preceding two sentences.

Figure 3:
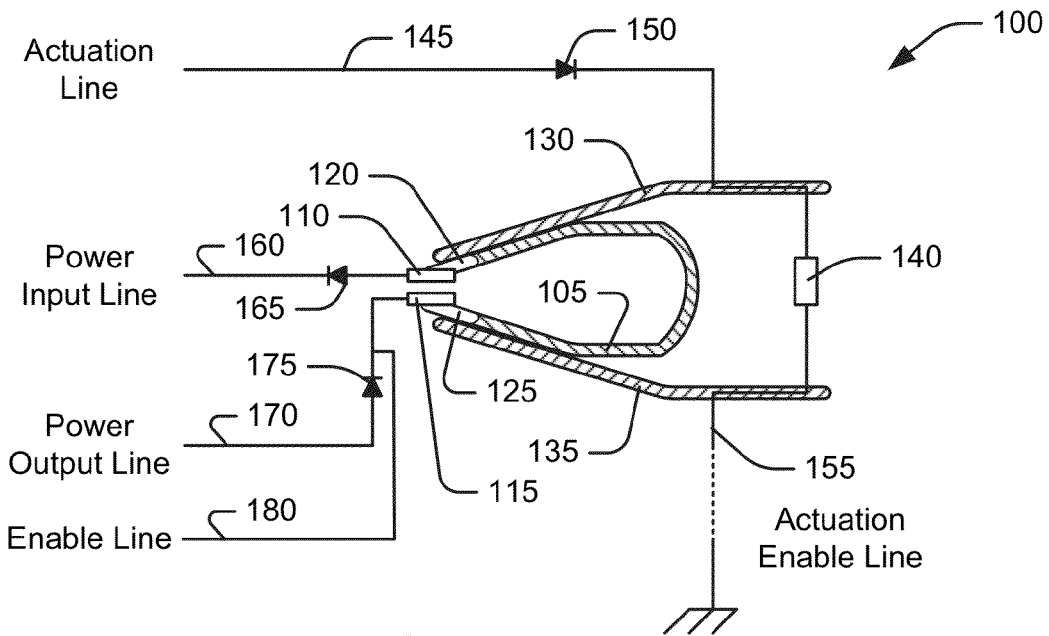
Figure 4:
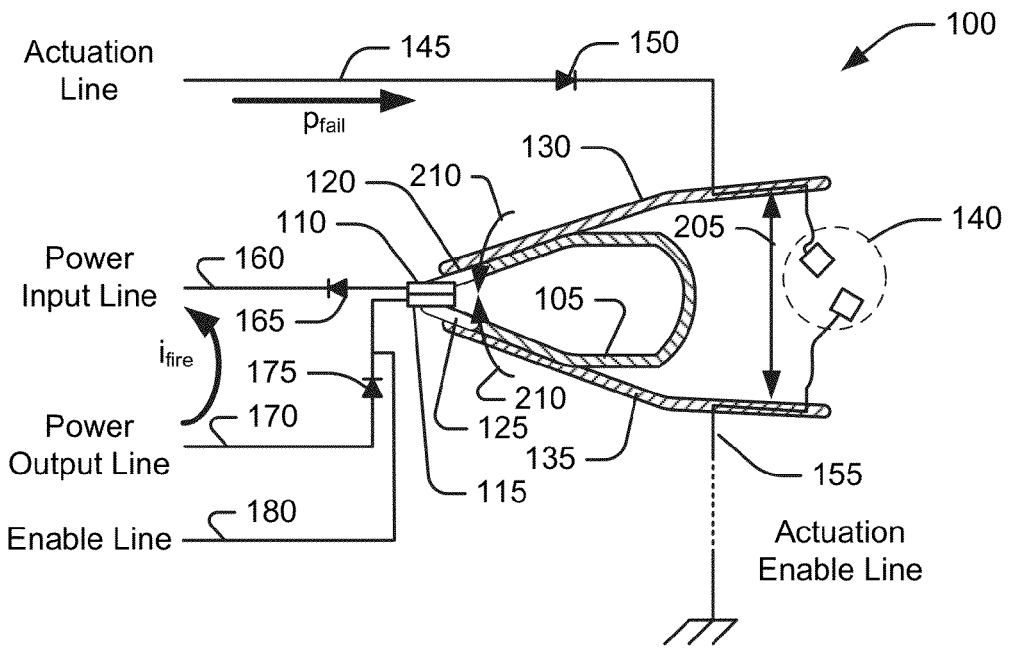

In one embodiment, shown in FIG. 3, the direction of current flow (or the polarity of the applied power) is reversed (as compared to the direction of current flow in FIG. 1) in both the actuation circuit, the circuit that includes the collapsing element 140, and the firing circuit, the circuit that includes the first contact 110 and the second contact 115. In one embodiment, the direction of current flow in the actuation circuit is reversed by reversing the polarity of diode 150 as compared to the polarity of diode 150 in FIG. 1. In one embodiment, the direction of current flow in the firing circuit is changed by changing the polarity of diodes 165 and 175 as compared to the polarity of diodes 165 and 175 in FIG. 1. Thus, in FIG. 1, the actuation circuit is activated by negative power and in FIG. 3, the actuation circuit is activated by positive power. In FIG. 1, the firing circuit is activated by positive power and in FIG. 3, the firing circuit is activated by negative power. In both FIG. 1 and FIG. 3, the power to activate the actuation circuit has the opposite polarity of the power to activate the firing circuit. FIG. 4, which is the same as FIG. 2 except for the polarity of $p_{fail}$ and $i_{fire}$, shows the deployment switch 100 after the collapsing element 140 has failed.

Figure 5:
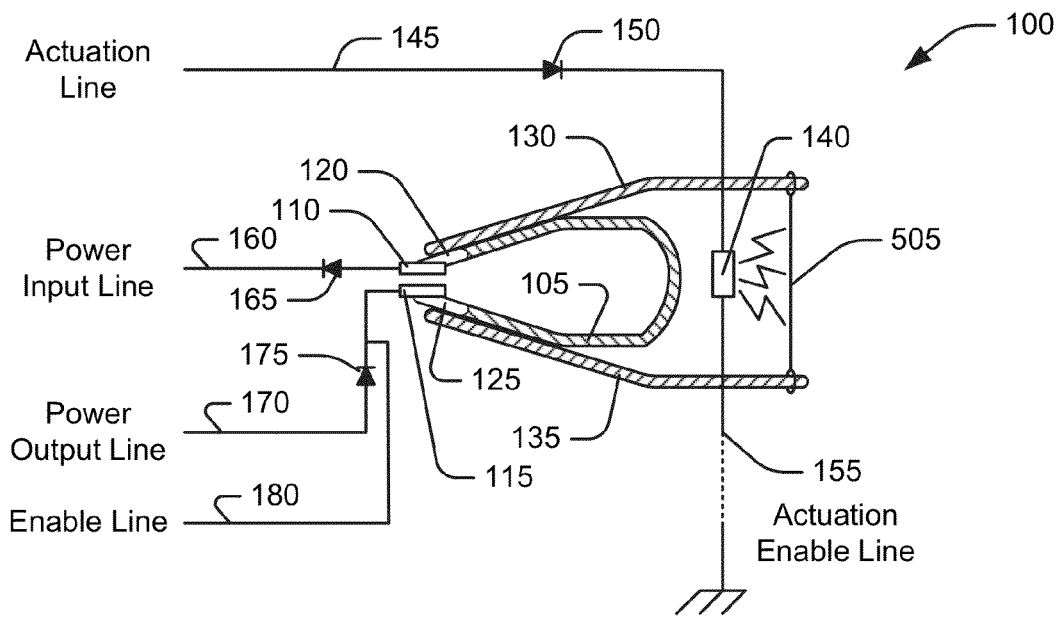

In one embodiment, illustrated in FIG. 5, the collapsing element 140, rather than failing itself, causes a restraining element 505 to fail. In one embodiment, the strain on the spring 105 is created by the restraining element 505 rather than the collapsing element 140. In one embodiment, while the collapsing element 140 is mechanically coupled to the handles 130 and 135, the mechanical coupling is not sufficiently strong to maintain the handles 130 and 135 in the positions shown in FIG. 5. Instead, the handles 130 and 135 are maintained in the positions shown by the restraining element 505.

In one embodiment, the restraining element 505 is an element that is predictably susceptible to structural failure when it exposed to heat. In one embodiment, the restraining element 505 is a tie wrap. In one embodiment, the restraining element is a rubber band. In one embodiment, the restraining element 505 is a eutectic substance, i.e., a mixture of two or more substances with a melting point lower than any of the substances in the mixture. In one embodiment, the eutectic substance is solder.

Figure 6:
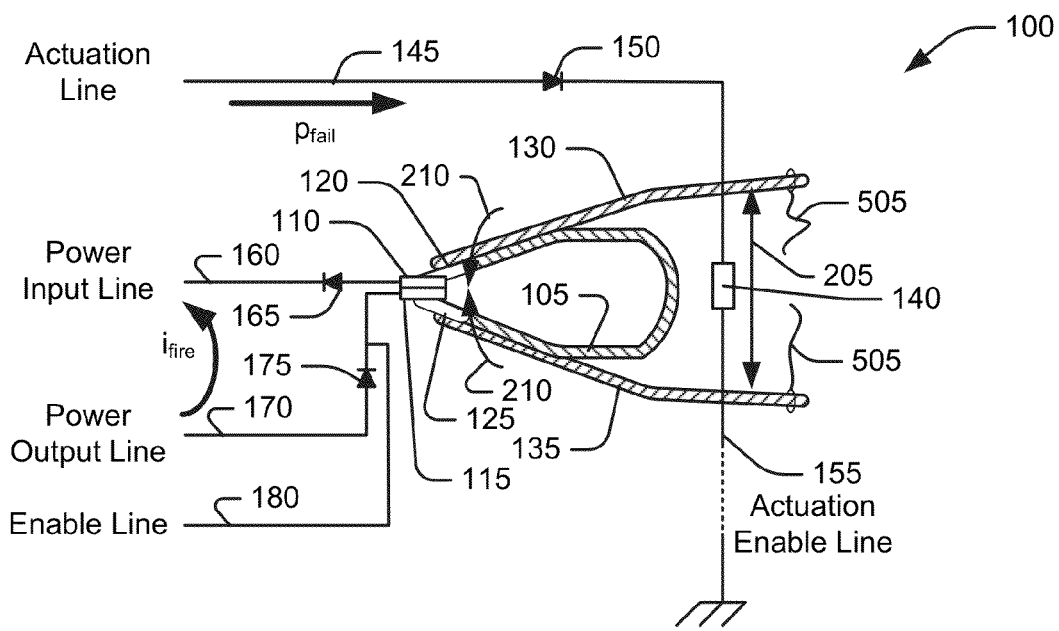

In one embodiment, the circuit in FIG. 5 operates in the same way as the circuit shown in FIG. 3 except that instead of the collapsing element 140 failing as in FIG. 3, heat from the collapsing element 140, indicated by the lightning bolt symbols adjacent the collapsing element 140 in FIG. 5, cause the restraining element 505 to melt or otherwise change state and fail or to weaken sufficiently to allow the spring to relax. The result, as shown in FIG. 6, is the same as in FIG. 4, except that the restraining element 505 has failed instead of the collapsing element 140. The contacts 110 and 115 have closed allowing the firing current $i_{fire}$ to flow through the firing circuit. In one embodiment, the word "actuate" as it is applied to a deployment switch, such as deployment switches 100, 1510, and 1515 (described below in the description of FIGS. 15 and 16), is defined to mean the process described in this paragraph. In one embodiment, the restraining element 505 is "permanently collapsible," which is defined to mean that the restraining element 505 does not recover or regain its ability to hold handles 130 and 135 in the position shown in FIG. 5 after its collapse. In one embodiment, the collapsing element 140 is destroyed when it collapses.

Figure 7:
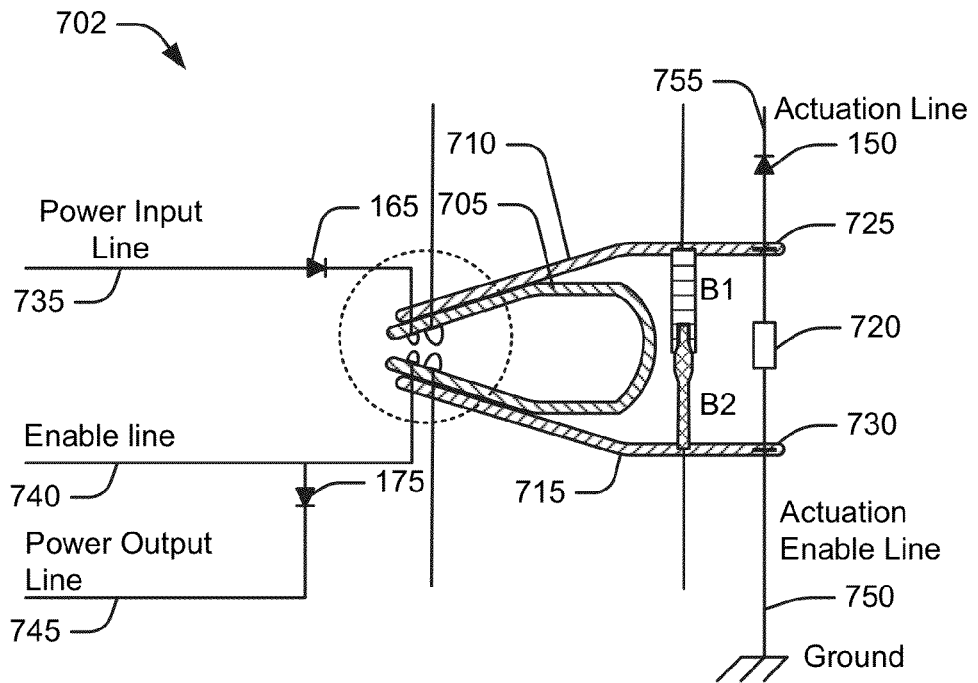

In one embodiment, illustrated in FIG. 7, a deployment switch 702, which is otherwise similar in construction and operation to the deployment switch 100 illustrated in FIGS. 1-6, includes three sets of switch contacts, two sets of normally-open contacts and one set of normally-closed contacts. It will be understood that the number of normally-open contacts and the number of normally-closed contacts discussed herein is merely illustrative and that any number of either variety of contacts can be included. The deployment switch 702 includes a spring 705 that, in one embodiment is made of non-conductive material. The deployment switch 702 further includes two handles 710 and 715 that are coupled to the spring 705 as shown in FIG. 7. In one embodiment, the two handles 710 and 715 are made of non-conductive material. In one embodiment, the deployment switch 702 includes a collapsing element 720 that is similar to the collapsing element 140 described above with respect to FIGS. 1-6. In one embodiment, the spring 705, handles 710 and 715, and the collapsing element 720 operate similarly to the similar elements described above with respect to FIGS. 1-6.

In one embodiment, the deployment switch 702 includes two normally-closed contacts B1 and B2, that are connected to each other when the deployment switch 702 is in the state shown in FIG. 7 (i.e., before the collapsing element 720 has collapsed). In one embodiment, the normally-closed contacts B1 and B2 are pressure fit together so that they maintain mechanical and electrical contact when the deployment switch 702 is in the state shown in FIG. 7 but can be separated by the application of force of an appropriate magnitude in the opposite direction to the two contacts B1 and B2. In one embodiment, the spring 705 applies a force of an appropriate magnitude when the collapsing element 720 collapses and allows the spring 705 to collapse back to its non-deformed state.

In one embodiment, as shown in FIG. 7, contact B1 is rigidly mounted to handle 710 and contact B2 is rigidly mounted to handle 715. In one embodiment, one or both of the contacts B1 and B2 is flexibly mounted to its respective handle 710 and 715. In one embodiment, one or both of the contacts B1 and B2 is attached to its respective handle 710 and 715 by a tether or wire (not shown).

In one embodiment, shown in FIG. 7, the collapsing element 720 is mechanically coupled to the handles 710 and 715 by anchors 725 and 730 that are embedded in handles 710 and 715, respectively. In one embodiment, the collapsing element 720 is mechanically coupled to the handles 710 and 715 by, for example, wrapping leads of the collapsing element 720, which in one embodiment is, for example, a low wattage resistor, a diode, a capacitor, a choke, or a length of NiCh (nickel chrome) wire, around handles 710 and 715, respectively. The collapsing element 140, shown in FIGS. 1-6 can be coupled to the handles 130 and 135 in the same way.

Figure 8:
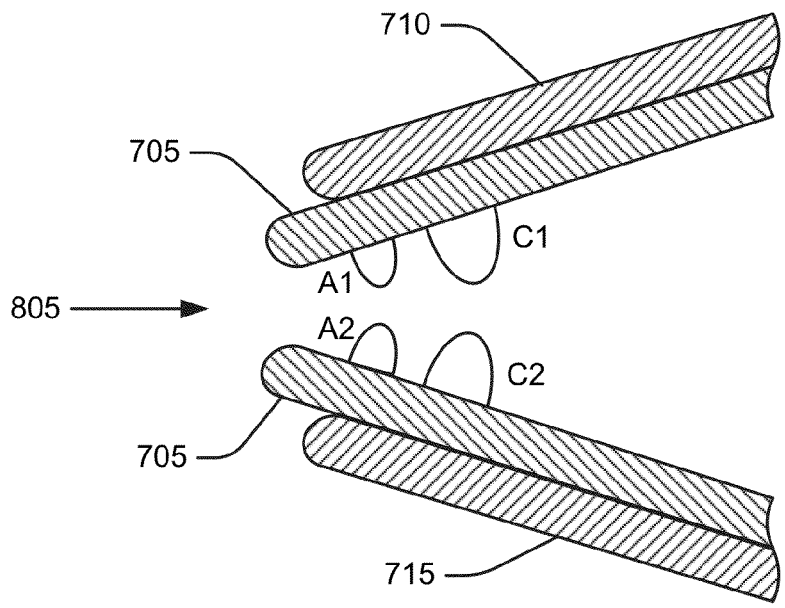

The normally-open contacts are illustrated in FIG. 8, which is a more detailed version of the area enclosed by the dashed circle in FIG. 7. As can be seen in FIG. 8, a first pair of normally-open contacts A1 and A2 is coupled to the spring 705 at a place near the opening 805 in the spring 705. Contact A1 is electrically isolated from contact A2 when the deployment switch 702 is in the condition shown in FIG. 7. A second pair of normally-open contacts C1 and C2 is coupled to the spring 705 such that the contacts A1 and A2 are closer to the opening 805 than the contacts C1 and C2. Contact C1 is electrically isolated from contact C2 when the deployment switch 702 is in the condition shown in FIG. 7. In one embodiment, A1, A2, C1, and C2 could replace contacts 110 and 115 in FIGS. 1-6.

In one embodiment, as discussed above, the spring 705 is completely non-conductive. In one embodiment, the spring 705 is non-conductive in the area where the contacts A1, A2, C1, and C2 are coupled. In one embodiment, the spring 705 is conductive and contacts A1, A2, C1, and C2 are coupled to the spring 705 using a non-conductive material or using a separator (not shown), such as a rubber or plastic gasket or washer, to prevent the contacts A1, A2, C1, and C2 from being electrically connected to the spring 705.

Returning to FIG. 7, in one embodiment, a "power input" line 735 is coupled to the anode of diode 165. In one embodiment, the cathode of diode 165 is coupled to contact A1.

In one embodiment, an "enable" line 740 is coupled to the anode of diode 175 and to contact A2.

In one embodiment, a "power output" line 745 is coupled to the cathode of diode 175.

In one embodiment, an "actuation enable" line 750, which is coupled to one side of the collapsing element 720, is coupled to ground.

In one embodiment, an "actuation" line 755 is coupled to the cathode of diode 150. In one embodiment, the anode of diode 150 is coupled to the side of the collapsing element 720 opposite the connection to the actuation enable line.

Figure 9:
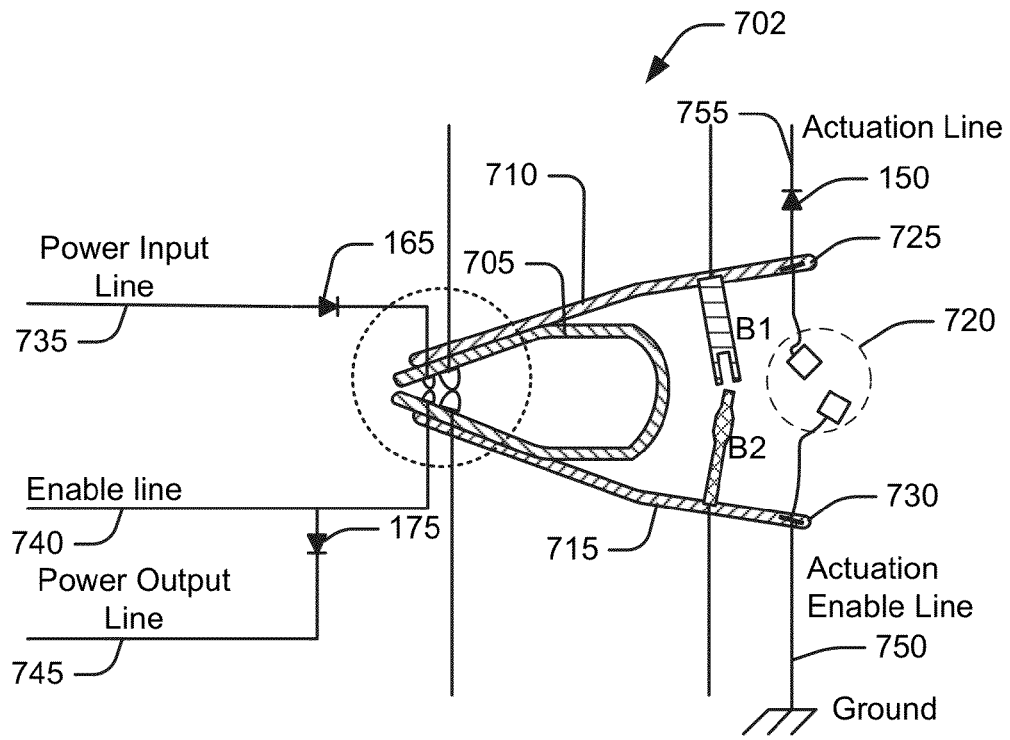
Figure 10:
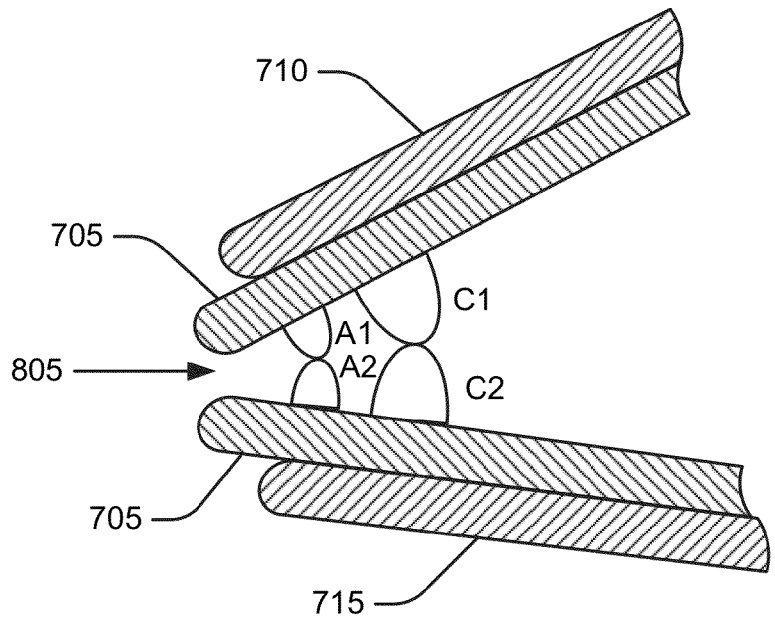

FIGS. 9 and 10 illustrate the deployment switch 702 after the collapsing element (indicated by the two broken pieces within the coarsely dashed circle labeled 720) has collapsed. The collapse of the collapsing element 720 allows the spring 705 to relax and narrow opening 805 to a state in which the contact A1 is mechanically and electrically connected to contact A2 and contact C1 is mechanically and electrically connected to contact C2, as shown in FIG. 10. The relaxation of the spring 705 causes the handle 715 to move away from the handle 710, which causes contact B1 to disconnect from contact B2. Thus, in one embodiment, the collapse of the collapsing element 720 closes contact A1 to contact A2 and contact C1 to contact C2 and disconnects contact B1 from contact B2. In one embodiment, the word "actuate" as it is applied to a deployment switch, such as deployment switch 702, is defined to mean the process described in this paragraph.

Generally, in one embodiment, the spring 705 has a first spring state, i.e., the state shown in FIG. 7, in which it is being held in tension by a restraining element, such as the collapsing element 720. Alternatively, the restraining element is similar in construction and operation to the restraining element 505 shown in FIGS. 5 and 6. In one embodiment, the spring 705 has a second spring state, i.e., the state shown in FIG. 9, in which it is not being held in tension because the restraining element, such as the collapsing element 720, has structurally failed. In one embodiment, the collapsing element 720 is situated or positioned such that, when sufficient power is applied to the collapsing element 720, heat from the collapsing element 720 will cause the restraining element, e.g. the collapsing element 720 itself or the restraining element 505, to fail.

In one embodiment, a first contact, e.g., A1, C1, or B1, is coupled to the spring 705. In one embodiment, contact B1 is indirectly coupled to the spring 705 through the handle 710. In one embodiment, a second contact, e.g., A2, C2, or B2 is coupled to the spring 705. In one embodiment, contact B2 is indirectly coupled to the spring through the handle 715.

In one embodiment, the first contact and the second contact have a "first 1-2 electrical connection state" when the spring 705 is in the first spring state. For example, if the first contact is A1 or C1 and the second contact is A2 or C2, the first spring state has the first contact electrically isolated, separate, or disconnected from the second contact. If the first contact is B1 and the second contact is B2, the first spring state has the first contact electrically connected to the second contact so that electrical current can flow from the first contact to the second contact.

In one embodiment, the first contact and the second contact have a "second 1-2 electrical connection state" when the spring 705 is in the second spring state. For example, if the first contact is A1 or C1 and the second contact is A2 or C2, the second spring state has the first contact electrically connected to the second contact. If the first contact is B1 and the second contact is B2, the second spring state has the first contact electrically isolated, separate, or disconnected from the second contact so that electrical current can flow from the first contact to the second contact.

In one embodiment, a third contact, e.g., A1, C1, or B1, is coupled to the spring 705. In one embodiment, contact B1 is indirectly coupled to the spring 705 through the handle 710. In one embodiment, a fourth contact, e.g., A2, C2, or B2, is coupled to the spring 705. In one embodiment, contact B2 is indirectly coupled to the spring through handle 715.

In one embodiment, the third contact and the fourth contact have a "first 3-4 electrical connection state" when the spring is in the first spring state. For example, if the third contact is A1 or C1 and the fourth contact is A2 or C2, the first spring state has the third contact electrically isolated, separate, or disconnected from the fourth contact so that no current can flow across the boundary between the third contact and the fourth contact. If the third contact is B1 and the fourth contact is B2, the first spring state has the third contact electrically connected to the fourth contact so that electrical current can flow from the third contact to the fourth contact.

In one embodiment, the third contact and the fourth contact have a "second 3-4 electrical connection state" when the spring 705 is in the second spring state. For example, if the third contact is A1 or C1 and the fourth contact is A2 or C2, the second spring state has the third contact electrically connected to the fourth contact so that electrical current can flow from the third contact to the fourth contact. If the third contact is B1 and the fourth contact is B2, the second spring state has the third contact electrically isolated, separate, or disconnected from the fourth contact so that no current can flow across the boundary between the third contact and the fourth contact.

Figure 11:
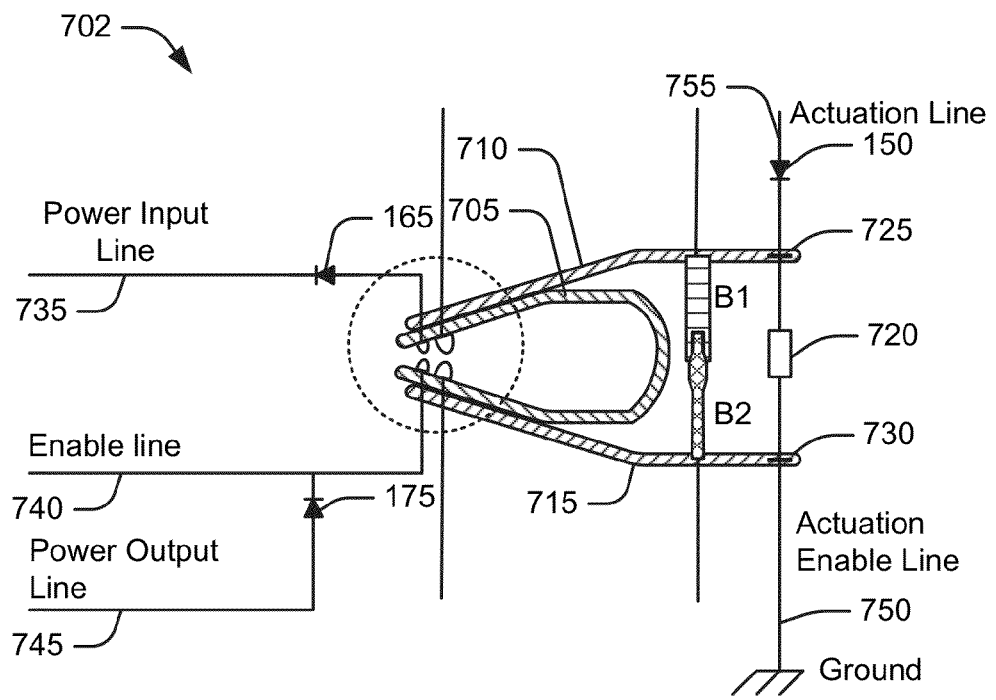
Figure 12:
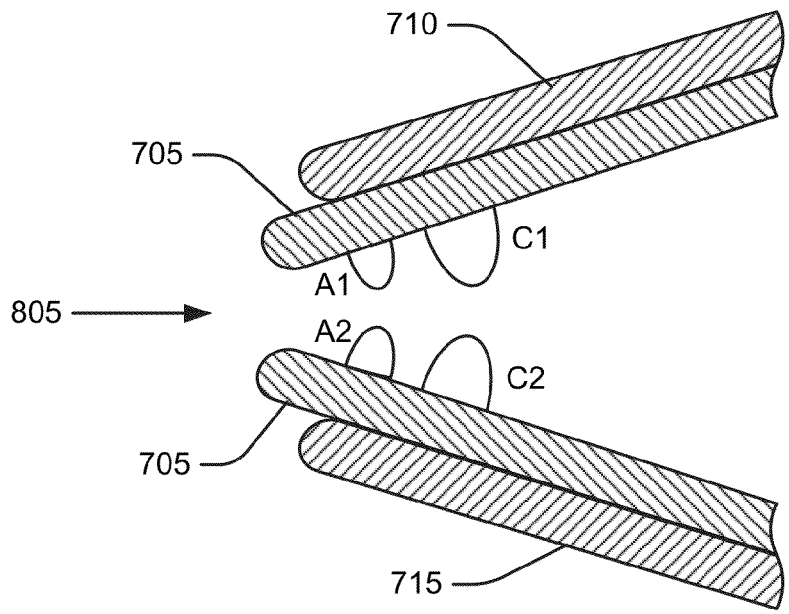

FIGS. 11 and 12 are identical to FIGS. 7 and 8 except that the polarity of the diodes is reversed. FIG. 7 shows a negative switch. FIG. 11 shows a positive switch. In one embodiment, the words "negative" and "positive" in the context of defining the polarity of a deployment switch are defined to mean the voltage on the device actuation line 1520 relative to circuit ground (i.e., the ground represented by the "ground" symbol in the figures of this application).

Figure 13:
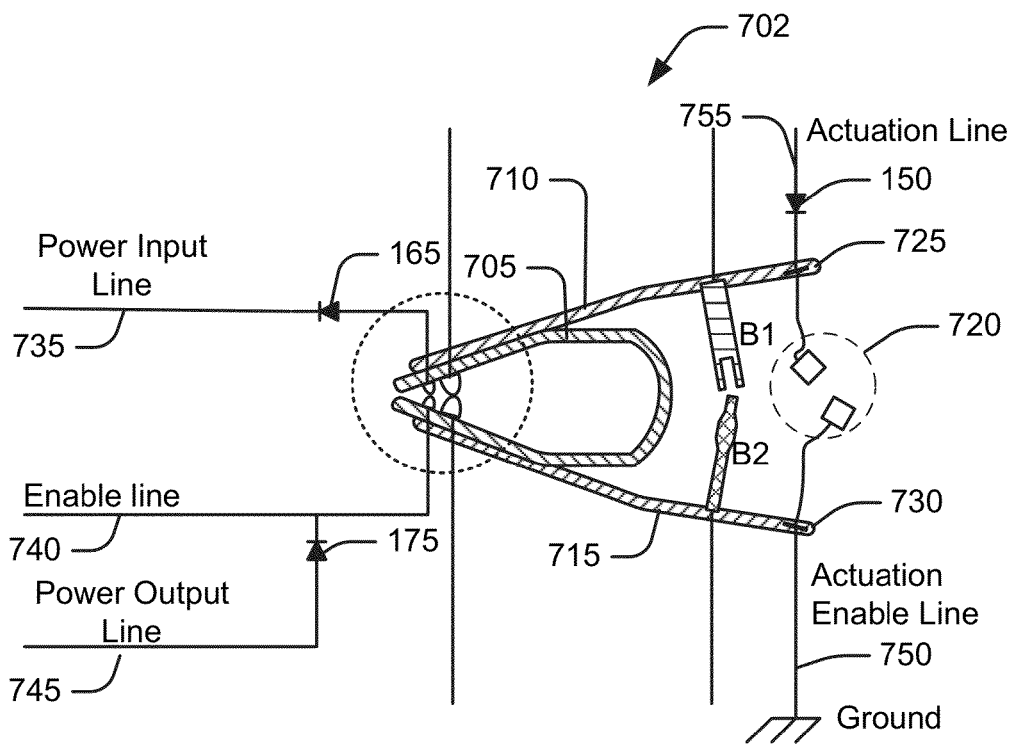
Figure 14:
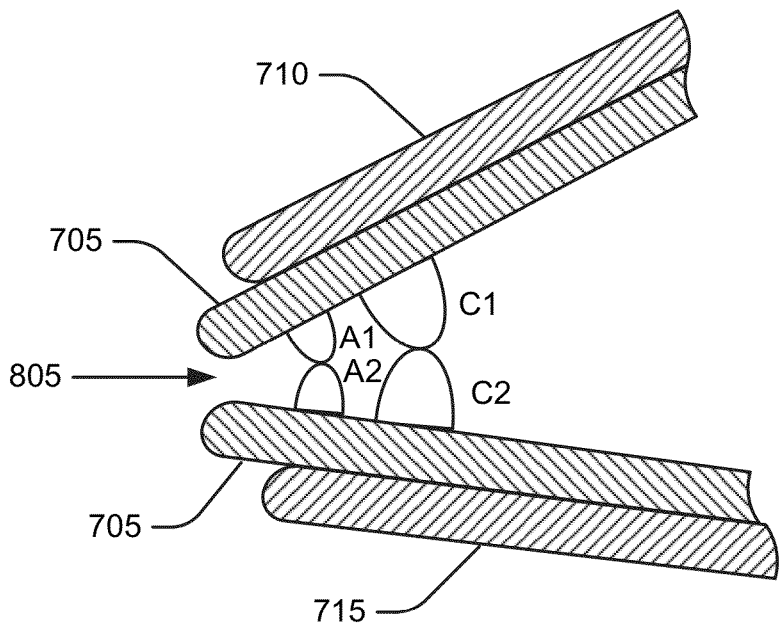

FIGS. 13 and 14 are identical to FIGS. 9 and 10 except that the polarity of the diodes is reversed. FIG. 9 shows a negative switch. FIG. 13 shows a positive switch.

Figure 15:
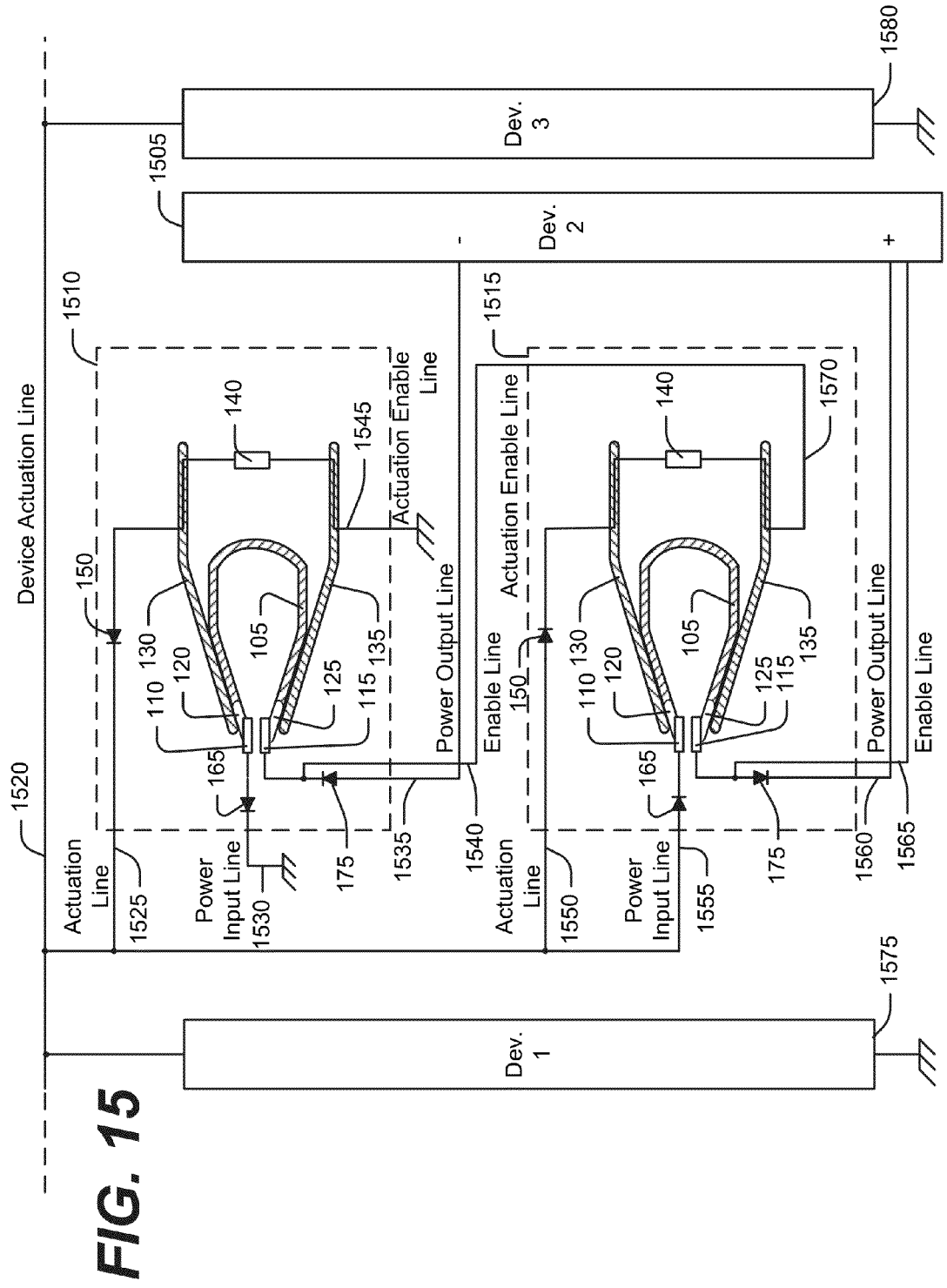
FIGS. 15-21 illustrate systems that incorporate deployment switches.

One embodiment, illustrated in FIG. 15, of a circuit to safely deploy electrical power to a transient-sensitive device 1505 includes a first deployment switch 1510 to isolate the transient-sensitive device 1505 from a first electrical power line (e.g., ground) and a second deployment switch 1515 to isolate the transient-sensitive device 1505 from a second electrical power line (e.g., +V volts). In one embodiment, one power line is provided via a device action line 1520 and the other power line is provided via a ground (e.g., chassis ground or a ground connection to earth or some other reference). It will be understood that this technique can be expanded to include isolating the transient-sensitive device 1505 from additional power inputs, such as the power inputs associated with three-phase alternating current or multiple DC voltages (i.e., +5V, −5V, +12V, −12V).

First deployment switch 1510 is a negative switch, such as that shown in FIG. 1. Second deployment switch 1515 is a positive switch, such as that shown in FIG. 3. In one embodiment, the components in the two deployment switches are the same: spring 105, first contact 110, second contact 115, nonconductive portions of the spring 120 and 125, handles 130 and 135, collapsing element 140, and diodes 150, 165, and 175, although the polarity of the diodes are reversed in deployment switch 1510 as compared to those of deployment switch 1515. The common components will be distinguished in the remaining discussion of FIG. 15 by prefacing the component reference number with the reference number of the associated deployment switch. For example, the spring in deployment switch 1510 will be referred to as spring 1510-105 and the spring in deployment switch 1515 will be referred to as spring 1515-105.

The first deployment switch 1510 and the second deployment switch 1515 illustrate additional flexibility in the configuration of these switches. In FIG. 13, the actuation line 150 is coupled to the anode of diode 150 and the power input line 735 is coupled to the cathode of diode 165. In FIG. 15, the cathodes of the corresponding diodes 1510-150 and 1510-165 are coupled to the actuation line 1525 and the power input line 1530 of the first deployment switch 1510, respectively. Similarly, the anodes of the corresponding diodes 1515-150 and 1515-165 are coupled to the actuation line 1550 and the power input line 1555 of the second deployment switch 1515. That is, while in FIG. 13 the actuation line and the power input line are coupled to the opposite terminal of their respective diodes, in FIG. 15 (and in FIG. 16) the actuation lines and the power input lines of the two deployment switches are coupled to the same terminal of their respective diodes. The polarities of the diodes 150 and 165 are selected according to the polarity of the deployment switch and the polarity of the voltage being isolated from the transient sensitive device 1505. The first deployment switch 1510 is a negative switch, which determines the polarity of diode 1510-150, and isolates the transient sensitive device 1505 from ground, which determines the polarity of diode 1510-165 and diode 1510-175. The second deployment switch 1515 is a positive switch, which determines the polarity of diode 1515-150, and isolates the transient sensitive device 1505 from a positive voltage on device action line 1520, which determines the polarity of diode 1515-165 and diode 1515-175. Other combinations of requirements can be met through proper selection of the polarities of the diodes in the deployment switches 1510 and 1515.

In one embodiment, the actuation line 1525 of the first deployment switch 1510 is coupled to the device actuation line 1520. In one embodiment, the power input line 1530 of the first deployment switch 1510 is coupled to one of the power lines, i.e., ground. In one embodiment, the power output line 1535 of the first deployment switch 1510 is coupled to one of the power inputs of the transient-sensitive device 1505. In one embodiment, the enable line 1540 of the first deployment switch 1510 is coupled to the second deployment switch 1510 as described below. In one embodiment, the actuation enable line 1545 of the first deployment switch 1510 is coupled to ground.

In one embodiment, the actuation line 1550 of the second deployment switch 1515 is coupled to the device actuation line 1520. In one embodiment, the power input line 1555 of the second deployment switch 1515 is coupled to the device actuation line 1520. In one embodiment, such as that shown in FIG. 15, the device actuation line 1520 provides the second power line (e.g., +V volts). In one embodiment, the power output line 1560 of the second deployment switch 1515 is coupled to a power input of the transient-sensitive device 1505. In one embodiment, the enable line 1565 of the second deployment switch 1515 is coupled to an input of the transient-sensitive device 1505, which is used for another purpose other than applying power such as detecting the presence of power. In one embodiment, the actuation enable line 1570 of the second deployment switch 1515 is coupled to the enable line 1540 of the first deployment switch 1510.

As can be seen in the embodiment shown in FIG. 15, the negative power input to the transient-sensitive device 1505 is isolated from the power lines through the deployment switch 1510. That is, the connection between the ground power line and the negative input to the transient-sensitive device 1505 is not made until the deployment switch 1510 closes so that contacts 1510-110 and 1510-115 are connected, which couples the power input line 1530 to the power output line 1535.

Similarly, the positive power input to the transient-sensitive device 1505 is isolated from the power lines through the deployment switch 1515. That is, the connection between the device actuation line 1520 and the positive input to the transient-sensitive device 1505 is not made until the deployment switch 1515 closes so that contacts 1515-110 and 1515-115 are connected, which couples the power input line 1555 to the power output line 1560.

In one embodiment, power is deployed to the transient-sensitive device 1505 as follows. In one embodiment, a negative power is applied to the device action line 1520. In one embodiment, the voltage or the current of the applied negative power is not sufficient or is the wrong polarity to activate or affect the other devices 1575 and 1580 that are coupled to the device actuation line 1520.

The negative power flows through the actuation line 1525, diode 1510-150, collapsing element 1510-140, and the actuation enable line 1545, to ground, causing the collapsing element 1510-140 to collapse structurally. This actuates deployment switch 1510 and connects the power input line 1530, which is connected to the ground power line, to the negative power input of the transient-sensitive device 1505. In addition, the actuation of deployment switch 1510 grounds the enable line 1540, which is connected to the actuation enable line 1570 of the deployment switch 1515. To this point the actuation enable line 1570 of the deployment switch 1515 had been floating so that even if positive power were intentionally or accidently (i.e., as a transient) applied to the actuation line 1550, the deployment switch 1515 would not actuate. Now that the actuation enable line 1570 is grounded, application of positive power to the actuation line 1550 will cause the deployment switch 1515 to actuate.

In one embodiment, a positive power is applied to the device actuation line 1520. In one embodiment, the voltage or the current of the applied positive power is not sufficient or is the wrong polarity to activate or affect the other devices 1575 and 1580 that are coupled to the device actuation line 1520.

The positive power flows through the actuation line 1550, diode 1515-150, collapsing element 1515-140, the actuation enable line 1570, the enable line 1540 of the deployment switch 1510, the contacts 1510-115 and 1510-110, the diode 1510-165, the power input line 1530, and to ground, causing the collapsing element 1515-140 to collapse structurally. The actuates deployment switch 1515 and connects the power input line 1555, which is connected to the device actuation line 1520, to the positive power input of the transient-sensitive device 1505.

With both power lines applied and positive power being present on the device actuation line 1520, the transient-sensitive device 1505 actuates and performs its function. In one embodiment, the transient sensitive device 1505 is a perforation gun that is part of a perforation assembly used to perforate downhole casing in a well to allow production of hydrocarbons from geological formations surrounding the downhole casing. Applying both power lines causes the perforating gun 1505 to activate (i.e., explode) and perforate the downhole casing.

Figure 16:
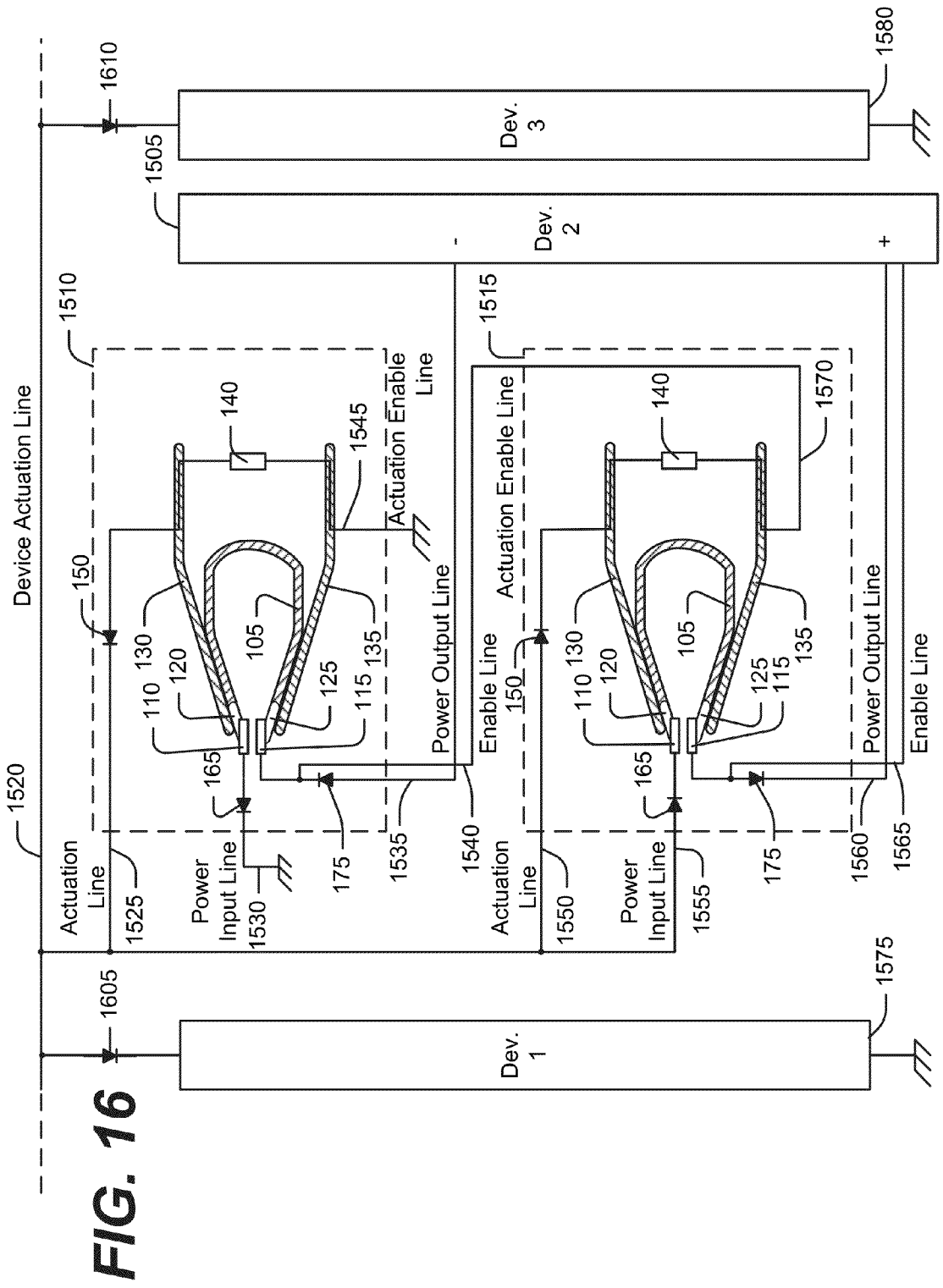

In one embodiment, shown in FIG. 16, diodes 1605 and 1610 are added to the circuit of FIG. 15 to prevent power from being applied to devices 1575 and 1580 when a negative power is present on the device actuation line 1520. In one embodiment (not shown), the polarities of diodes 1605 and 1610 are reversed to prevent power from being applied to devices 1575 and 1580 when a positive power is present on the device actuation line 1520. In one embodiment, devices 1575 and 1580 are downhole tools, such as a gamma ray correlation tool, a setting tool (used, for example, to set pipe obturating devices such as a bridge plug or a packer), a wireline tractoring tool, a pipe calipering tool, or other similar tools. In one embodiments, devices 1575 and 1580 are above (i.e., closer to the earth's surface) than transient sensitive device 1505 in a borehole. In one embodiment, device 1575 is above transient sensitive device 1505 and device 1580 is below (i.e., further away from the earth's surface) transient sensitive device 1505. In one embodiment, devices 1575 and 1580 are below transient sensitive device 1505.

Figure 17:
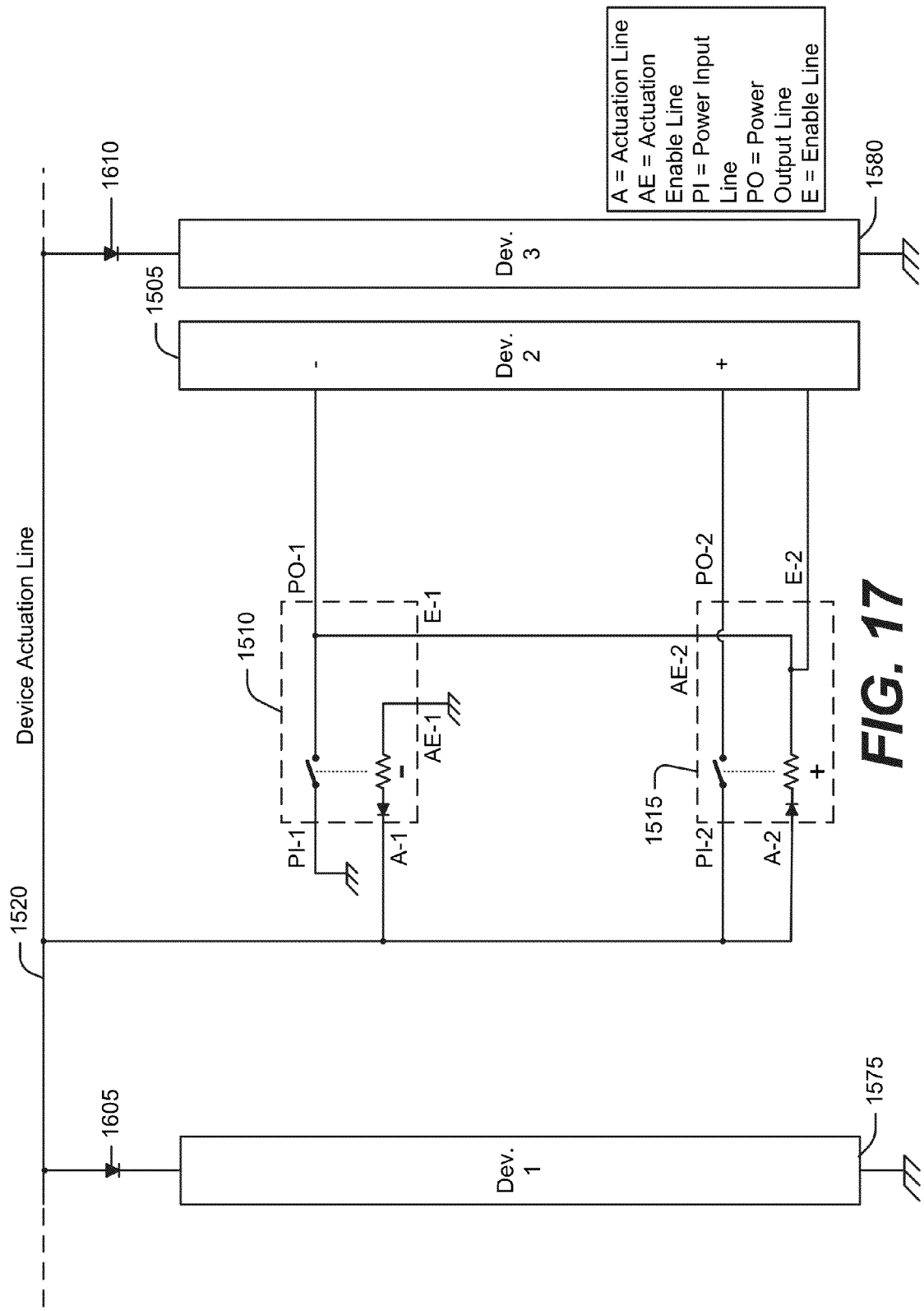

FIG. 17 is a simplified representation of the circuit in FIG. 16. The circuitry of the deployment switches 1510 and 1515 is represented schematically by a resistor, representing the collapsing element 140, a diode, representing the diode 150, that establishes the polarity of power that activates the switch, and a single-pole-single-throw switch, that represents the contacts 110 and 115. The schematic representation of the deployment switch 1510 includes three inputs: PI-1, A-1, and AE-1, which are the power input line, the actuation line, and the actuation enable line, respectively; and two outputs: PO-1 and E-1, which are the power output line and the enable line, respectively. The schematic representation of the deployment switch 1515 includes three inputs: PI-2, A-2, and AE-2, which are the power input line, the actuation line, and the actuation enable line, respectively; and two outputs: PO-2 and E-2, which are the power output line and the enable line, respectively. This nomenclature is also used in FIGS. 18-21.

Figure 18:
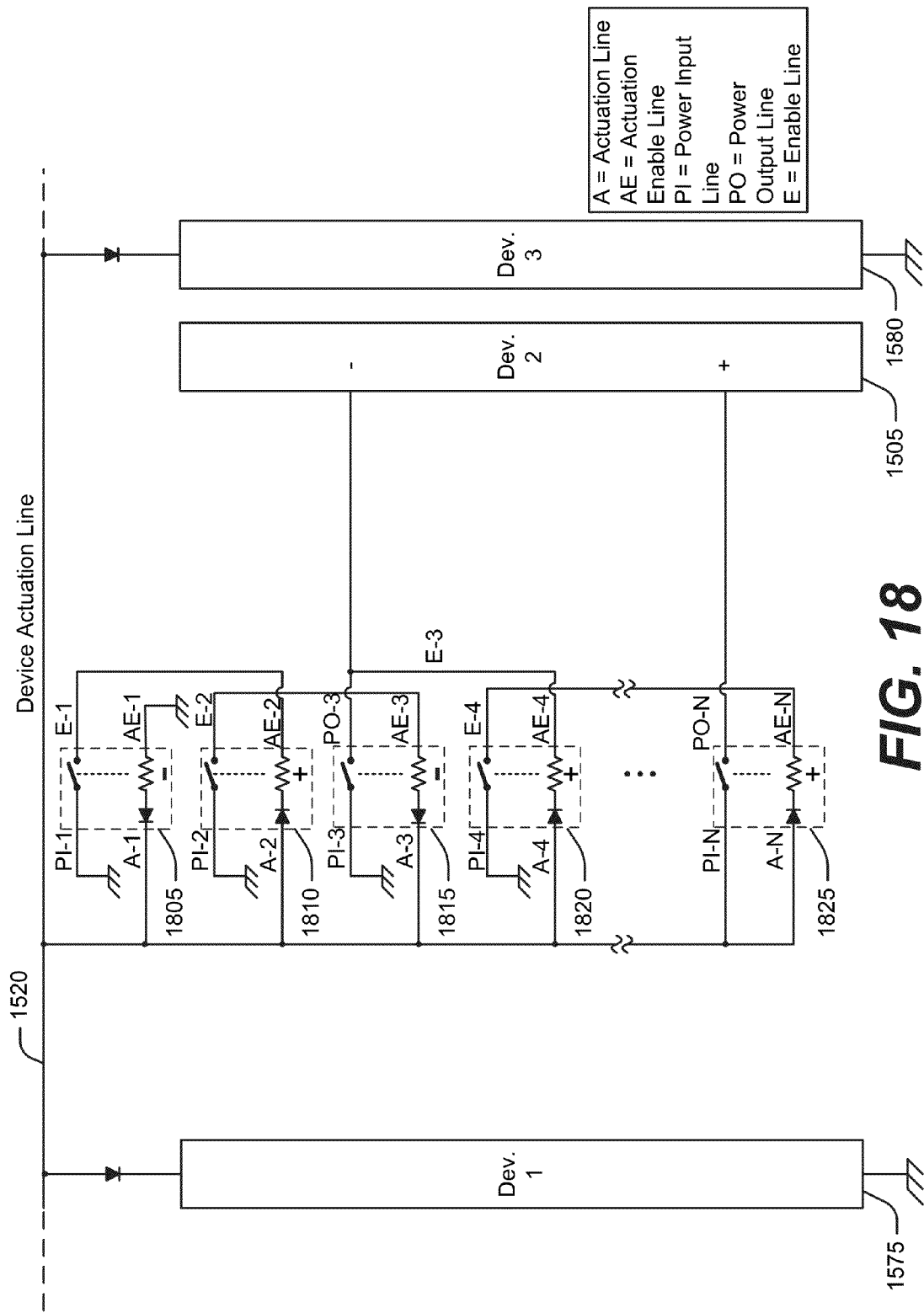

In one embodiment, shown in FIG. 18, a plurality of deployment switches isolates the power lines from the transient-sensitive device 1505. In one embodiment, the first power input to the transient-sensitive device 1505 is isolated from the first power line (i.e., ground) by deployment switches 1805, 1810, and 1815. In one embodiment, the second power input to the transient-sensitive device 1505 is isolated from the second power line (i.e., the power provided over the device actuation line 1520) by deployment switch 1820, one or more additional deployment switches represented by the ellipsis in FIG. 18, and deployment switch 1825.

In one embodiment, deployment switch 1805 has a power input line PI-1 coupled to ground, an actuation line A-1 coupled to the device actuation line 1520, an enable line E-1 coupled to deployment switch 1810 as described below, and an actuation enable line AE-1 coupled to ground. Although not shown, in one embodiment, the deployment switch 1805 includes a power output line that is not used or its use is not pertinent to this discussion.

In one embodiment, deployment switch 1810 has a power input line PI-2 coupled to ground, an actuation line A-2 coupled to the device actuation line 1520, an enable line E-2 coupled to deployment switch 1815 as described below, and an actuation enable line AE-2 coupled to the enable line E-1 of deployment switch 1805. Although not shown, in one embodiment, the deployment switch 1810 includes a power output line that is not used or its use is not pertinent to this discussion.

In one embodiment, deployment switch 1815 has a power input line PI-3 coupled to ground, an actuation line A-3 coupled to the device actuation line 1520, an enable line E-3 coupled to deployment switch 1820 as described below, and an actuation enable line AE-2 coupled to the enable line E-2 of deployment switch 1810. In one embodiment, the deployment switch 1815 includes a power output line PO-3 that is coupled to the negative power input of the transient-sensitive device 1505.

In one embodiment, deployment switch 1820 has a power input line PI-4 coupled to ground, an actuation line A-4 coupled to the device actuation line 1520, an enable line E-4 coupled to deployment switches represented by the ellipsis, and an actuation enable line AE-4 coupled to the enable line E-3 of deployment switch 1815. PO-3 and E-3 can be tied together, though at times there may be a diode on the power output line PO-3 for additional safety (e.g., see diode 175 in FIGS. 1-6, 7, 9, 11, 13, 15, and 16). In one embodiment, the enable line E-3 and the power output line PO-3 are separate pins on a deployment package and they are tied together externally. In one embodiment, E-3 and PO-3 are tied together internally. Although not shown, in one embodiment, the deployment switch 1820 includes a power output line that is not used or its use is not pertinent to this discussion.

In one embodiment, the one or more additional deployment switches represented by the ellipsis are similarly connected.

In one embodiment, deployment switch 1825 has a power input line PI-N coupled to the device actuation line 1520, an actuation line A-N coupled to the device actuation line 1520, an actuation enable line AE-2 coupled to an enable line of one of the deployment switches represented by the ellipsis, and a power output line PO-N that is coupled to the positive power input of the transient-sensitive device 1505. Although not shown, in one embodiment, the deployment switch 1825 has an enable line that is not used or its use is not pertinent to this discussion.

In one embodiment that further enhances the level of protection against spurious voltages or unintended or accidental operator actions, power is deployed to the transient-sensitive device as follows:

Negative power is applied to the device actuation line 1520. This activates deployment switch 1805, which couples PI-1 to AE-2 through E-1. None of the other switches are activated because the flow of negative power is prevented by the input diode (in the case of deployment switch 1810) or the actuation enable line is floating (in the case of the other deployment switches).

Positive power is applied to the device actuation line 1520. This activates deployment switch 1810, which couples PI-2 to AE-3 through E-2. None of the other switches are activated because the flow of positive power is prevented by the input diode (in the case of deployment switch 1815) or the actuation enable line is floating (in the case of the other deployment switches).

Negative power is applied to the device actuation line 1520. This activates deployment switch 1815, which couples PI-3 to AE-4 through E-3 and PO-3 to the negative input of transient-sensitive device 1505. None of the other switches are activated because the flow of negative power is prevented by the input diode (in the case of deployment switch 1820) or the actuation enable line is floating (in the case of the other deployment switches).

Positive power is applied to the device actuation line 1520. This activates deployment switch 1820, which couples PI-4 to the actuation enable line of one of the deployment switches represented by the ellipsis through E-4. None of the other switches are activated because the flow of positive power is prevented by an input diode or the actuation enable line is floating (in the case of the other deployment switches).

Positive and negative power is applied in an alternating fashion to the deployment switches represented by the ellipsis. When the last one is activated, its power input line (PI-N−1) is coupled to the enable line of the application enable line AE-N of deployment switch 1825 through enable line (i.e., E-N−1).

Positive power is applied to the device actuation line 1520. This activates deployment switch 1825, which couples PI-N to the positive input of transient-sensitive device 1505 through PO-N.

As can be seen, in the embodiment shown in FIG. 18, deployment of power to the transient-sensitive device 1505 requires applying a series of alternating positive and negative powers to the device action line 1520. In that embodiment, even after the first power line (i.e., PO-3) is applied to the transient-sensitive device 1505, additional applications of alternating positive and negative powers to the device actuation line 1520 are required to apply the second power line (i.e., PO-N) to the transient-sensitive device 1505.

Figure 19:
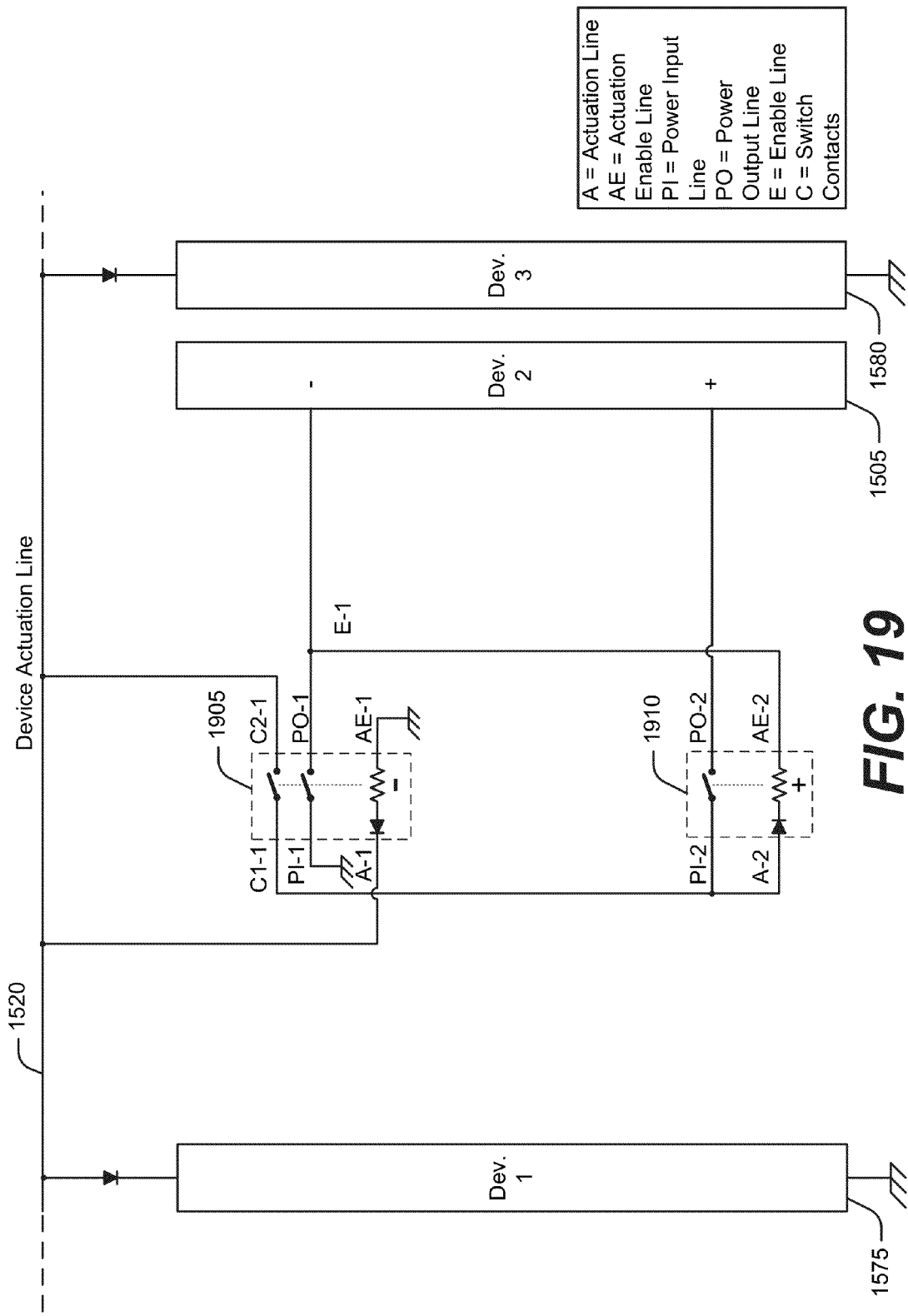

In one embodiment, shown in FIG. 19, a first deployment switch 1905 isolates both sides of the actuation circuit of a second deployment switch 1910. In one embodiment, the first deployment switch 1905 is of the type shown in FIGS. 7-10, with two sets of normally open contacts (a first set PI-1/PO-1 and a second set C1-1/C2-1, which are similar to the contacts A1/A2 and C1/C2 shown in FIGS. 7-12). In one embodiment, its actuation line A-1 is coupled to the device actuation line 1520 and its actuation enable line AE-1 is coupled to ground. In one embodiment, its power input line PI-1 is coupled to a first power line (i.e., ground) and its power output line PO-1 is coupled to one of the power input lines on the transient-sensitive device 1505. In one embodiment, its enable line E-1 is coupled to the second deployment switch 1910 as described below. In one embodiment, one side of the second set of normally open contacts C2-1 is coupled to the device actuation line 1520 and the other side of the second set of normally open contacts C1-1 is coupled to the second deployment switch as described below.

In one embodiment, the power input line PI-2 and the actuation line A-2 of the second deployment switch 1910 are coupled to C1-1. In one embodiment, the actuation enable line AE-2 of the second deployment switch 1910 is coupled to the enable line E-1 of the first deployment switch 1905. As discussed above, in one embodiment, the enable line E-1 is tied to the power output line PO-1 inside a deployment package. In one embodiment, the enable line E-1 and the power output line PO-1 are on separate pins or terminals on the outside of the deployment package and they are tied together at those points. In one embodiment, its power output line PO-2 is coupled to the other power input line of the transient-sensitive device 1505.

In one embodiment, deploying power to the transient-sensitive device 1505 in the circuit in FIG. 19 proceeds as follows. In the beginning, both sides of the actuation circuit (i.e., A-2 and AE-2) are floating. In one embodiment, a negative voltage is applied to the device actuation line 1520 causing the first deployment switch 1905 to actuate. This actuation causes: (a) the first power line (i.e., ground) to be coupled to one of the power inputs on the transient-sensitive device 1505 through the power output line PO-1, (b) the actuation line A-2 of the second deployment switch 1910 to be coupled to the device actuation line 1520 through C1-1 and C2-1, and (c) the actuation enable line AE-2 of the second deployment switch to be coupled to ground through E-1. In one embodiment, a positive voltage is applied to the device actuation line 1520 causing the second deployment switch 1910 to actuate. This actuation causes power to be applied to the other power input on the transient-sensitive device 1505 through the power output line PO-2.

Figure 20:
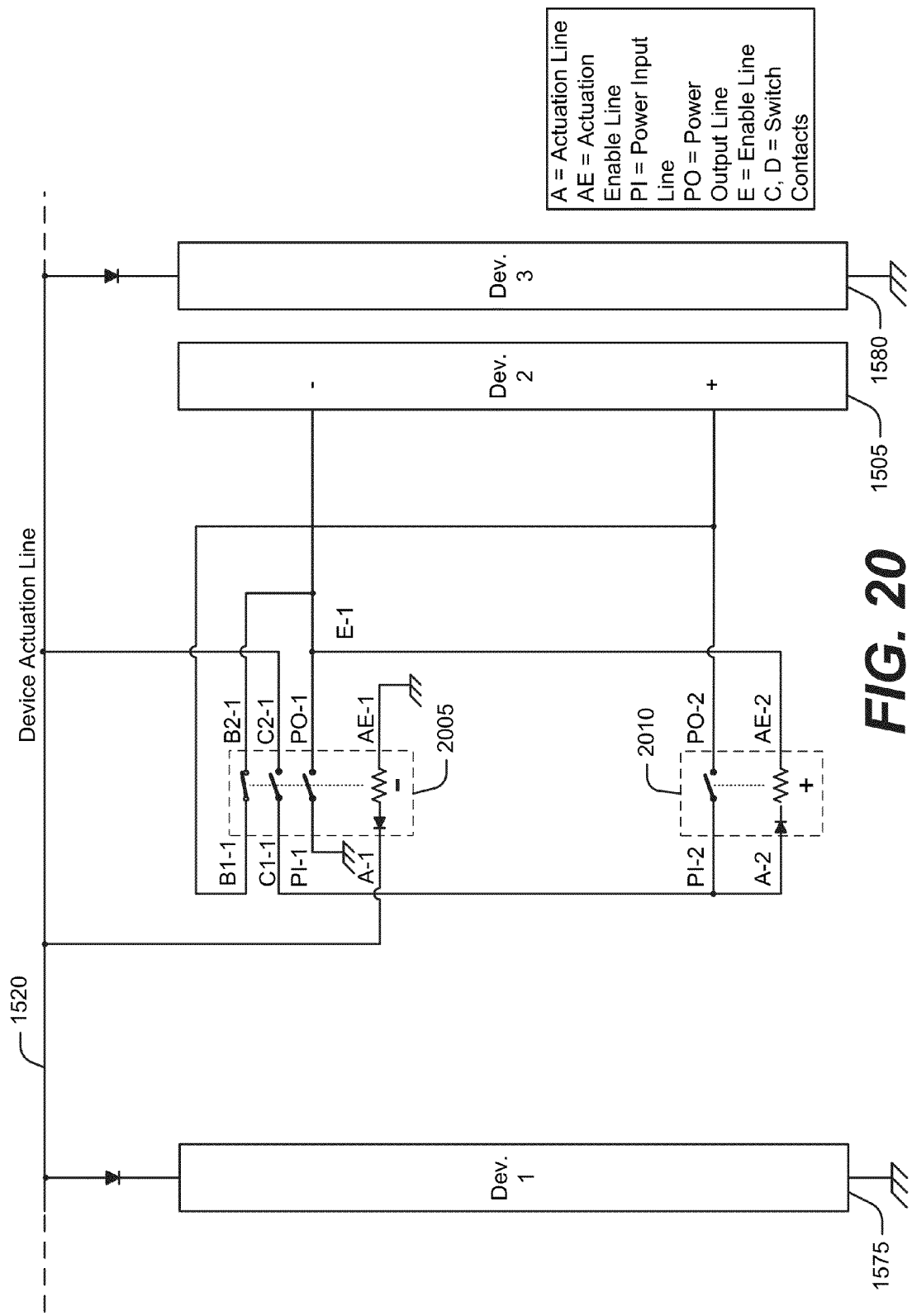

In one embodiment, shown in FIG. 20, a first deployment switch 2005 isolates both sides of the actuation circuit of a second deployment switch 2010 and shorts together the two power inputs of the transient-sensitive device 1505 until the first deployment switch 2005 is actuated. Shorting together the two power inputs can provide further immunization against transients.

As can be seen in FIG. 20, first deployment switch 2005 includes two normally-open sets of contacts (PI-1/PO-1 and C1-1/C2-1) and one normally closed set of contacts (B1-1/B2-1). In one embodiment, first deployment switch 2005 is similar to the switch shown in FIGS. 7-10, with the PI-1/PO-1 contacts being similar to the A1/A2 contacts, the C1-1/C2-1 contacts being similar to the C1/C2 contacts, and the B1-1/B2-1 contacts being similar to the B1/B2 contacts.

In one embodiment, the circuit in FIG. 20 is identical to the circuit in FIG. 19 except for the use of the B1-1/B2-1 contacts. In one embodiment, the actuation line A-1 of the first deployment switch 2005 is coupled to the device actuation line 1520 and its actuation enable line AE-1 is coupled to ground. In one embodiment, its power input line PI-1 is coupled to a first power line (i.e., ground) and its power output line PO-1 is coupled to one of the power input lines on the transient-sensitive device 1505. In one embodiment, its enable line E-1 is coupled to the second deployment switch 2010 as described below. In one embodiment, one side of the second set of normally open contacts C2-1 is coupled to the device actuation line 1520 and the other side of the second set of normally open contacts C1-1 is coupled to the second deployment switch 2010 as described below. In one embodiment, the B1-1 contact is coupled to one of the power inputs to the transient-sensitive device 1505 and the B2-1 contact is coupled to the other power input to the transient-sensitive device 1505. In the state shown in FIG. 20, the B1-1 contact is in electrical and mechanical contact with the B2-1 contact and the two power inputs to the transient-sensitive device 1505 are shorted together.

In one embodiment, the power input line PI-2 and the actuation line A-2 of the second deployment switch 2010 are coupled to C1-1. In one embodiment, the actuation enable line AE-2 of the second deployment switch 2010 is coupled to the enable line E-1 of the first deployment switch 2005. In one embodiment, its power output line PO-2 is coupled to the other power input line of the transient-sensitive device 1505.

In one embodiment, deploying power to the transient-sensitive device 1505 in the circuit in FIG. 20 proceeds as follows. In the beginning, both sides of the actuation circuit (i.e., A-2 and AE-2) of the second deployment switch 2010 are floating. In one embodiment, a negative voltage is applied to the device actuation line 1520 causing the first deployment switch 2005 to actuate. This actuation causes: (a) the first power line (i.e., ground) to be coupled to one of the power inputs on the transient-sensitive device through the power output line PO-1, (b) the actuation line A-2 of the second deployment switch 1910 to be coupled to the device actuation line 1520 through C1-1 and C2-1, (c) the actuation enable line AE-2 of the second deployment switch to be coupled to ground through E-1, and (d) the B1-1/B2-1 contacts to open, which removes the short circuit between the power inputs to the transient-sensitive device 1505. In one embodiment, a positive voltage is applied to the device actuation line 1520 causing the second deployment switch 2010 to actuate. This actuation causes power to be applied to the other power input on the transient-sensitive device 1505 through the power output line PO-2.

In one embodiment, the power input line 1555 of FIG. 16, PI-2 of FIG. 17, PI-N of FIG. 18, PI-2 of FIG. 19, or PI-2 of FIG. 20 is coupled to a source of power other than the device actuation line 1520 so that, for example, power applied to the transient-sensitive device 1505 remains steady even if the power applied to the device actuation line 1520 fluctuates.

Figure 21:
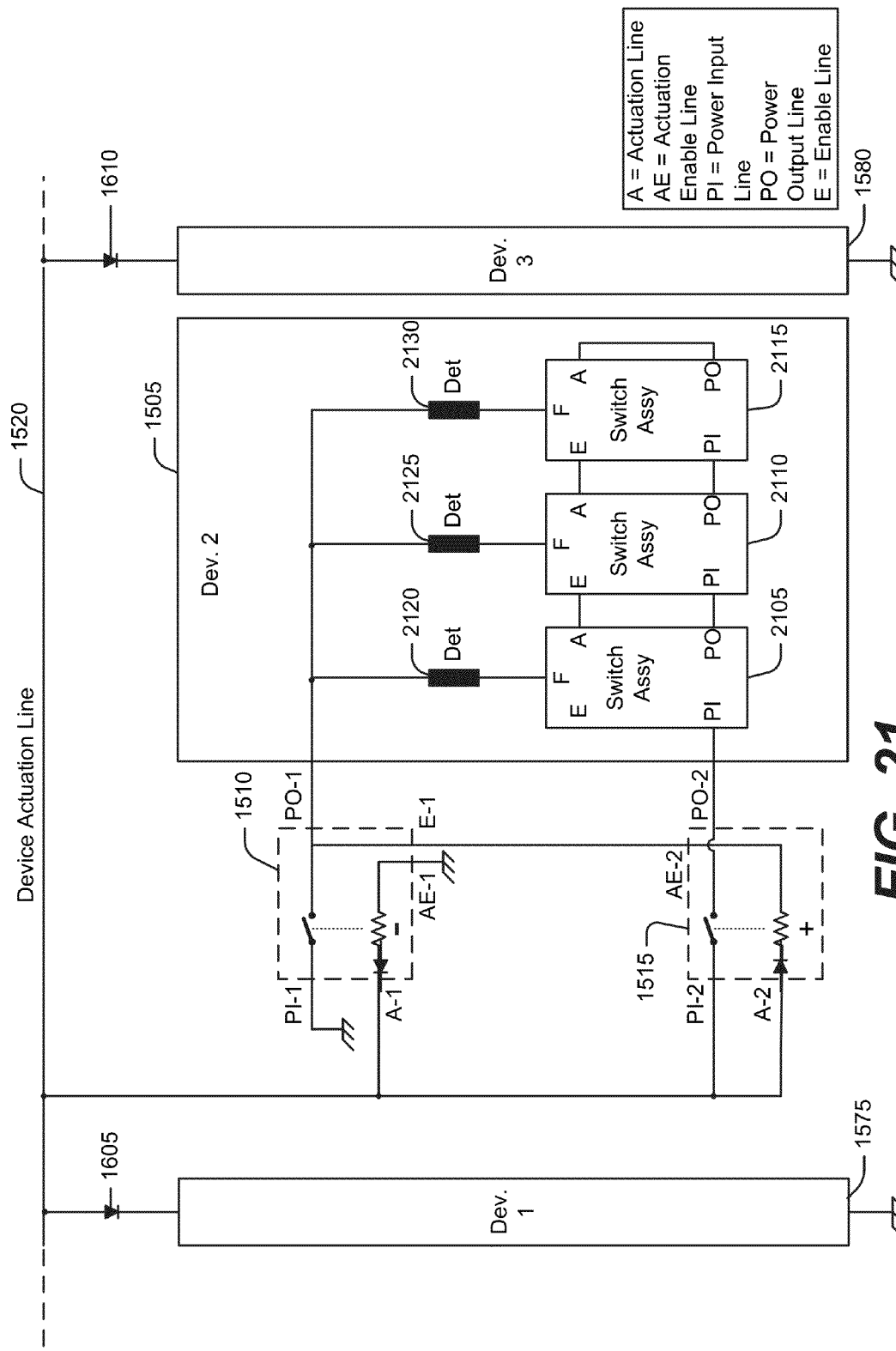
Figure 22:
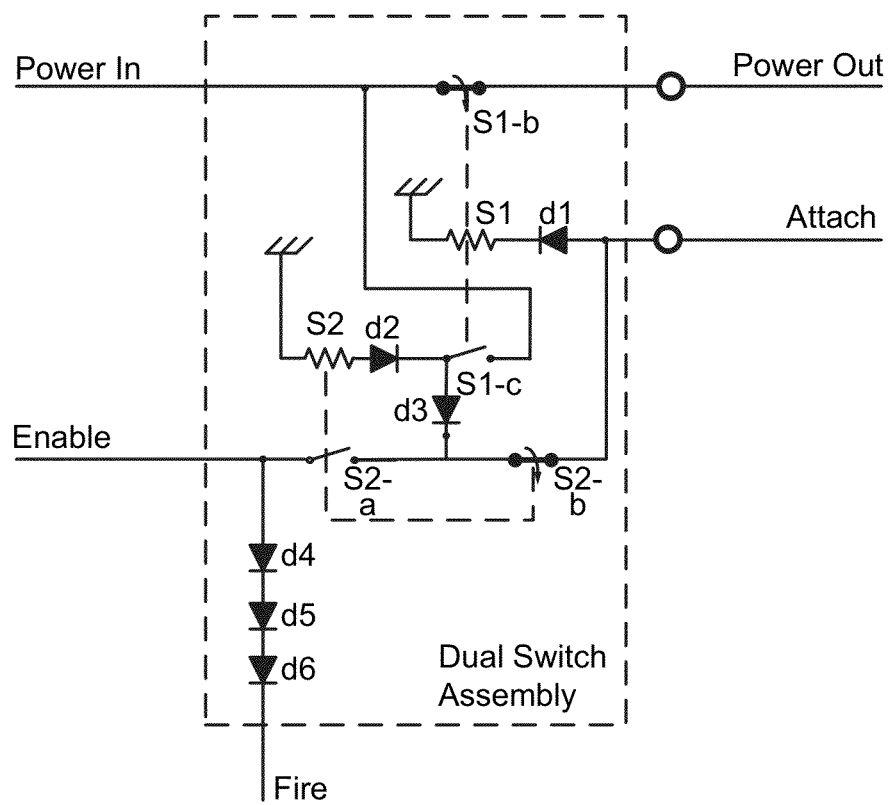
FIG. 22 illustrates a dual switch assembly.

In one embodiment, shown in FIG. 21, the transient-sensitive device 1505 includes a plurality of switch assemblies 2105, 2110, 2115 and detonators, 2120, 2125, 2130 such as those described in International Patent Application No. PCT/US2011/055729, filed on Oct. 11, 2011. In one embodiment, the switch assemblies are dual switch assemblies, illustrated in FIG. 22, such as those described in the patent application identified in the preceding sentence. Referring to FIG. 22, in one embodiment, the dual switch assembly 2205 includes two switches S1 and S2. Switch S1 is a positive switch of the sort shown in FIGS. 11 and 13. Switch S2 is a negative switch of the sort shown in FIGS. 7 and 9. In one embodiment, switch S1 has a set of normally-open contacts S1-c, which are similar to contacts C1/C2 in FIGS. 11 and 13, and a set of normally-closed contacts S1-b, which are similar to contacts B1/B2 in FIGS. 11 and 13. In one embodiment, switch S2 has two sets of normally-open contacts S1-a and S1-c, which are similar to contacts C1/C2 in FIGS. 7 and 9, and a set of normally-closed contacts S1-b, which are similar to contacts B1/B2 in FIGS. 7 and 9.

Referring again to FIG. 21, in one embodiment, the power out line (abbreviated "PO" in FIG. 21) and the attach line (abbreviated "A" in FIG. 21) of switch assembly 2115 are connected. In one embodiment, applying positive power to the power in line (abbreviated "PI") of switch assembly 2115 in FIG. 21 will actuate switch S1, opening contacts S1-b and closing contacts S1-c. Then, in one embodiment, applying negative power to the power in line will actuate switch S2, opening contact S2-b and closing contact S2-a and S2-c. Then, in one embodiment, applying positive power to the power in line will apply positive power to the fire line (abbreviated "F" in FIG. 21) and the enable line (abbreviated "E" in FIG. 21).

In one embodiment, the polarity of diodes d1-d6 determines the sequence of power polarities that cause the actions described above. In one embodiment, with the polarities shown in FIG. 22 (which is the configuration of switch assemblies 2105 and 2115 in FIG. 21) the sequence is positive-negative-positive. In one embodiment, reversing the polarities of diodes d1-d6 (which is the configuration of switch assembly 2110 in FIG. 21) cause the sequence to reverse, i.e., negative-positive-negative. In one embodiment, the connection of the enable line of switch assembly 2115 to the attach line of switch assembly 2110 means that switch assembly 2110 will be attached when the positive-negative-positive sequence for switch assembly 2115 is completed. Similarly, in one embodiment, the connection of the enable line of switch assembly 2110 to the attach line of switch assembly 2105 means that switch assembly 2105 will be attached when the negative-positive-negative sequence for switch assembly 2110 is completed.

As can be seen in the embodiment shown in FIG. 21, the detonators 2120, 2125, 2130 are coupled to the fire output (abbreviated "F") of the switch assemblies 2105, 2110, 2115, respectively. In the condition shown in the embodiment shown in FIG. 21, however, one side of each of the detonators 2120, 2125, 230 is coupled to the PO-1 output of deployment switch 1510 and is therefore floating. In one embodiment, applying negative power to deployment switch 1510 causes it to actuate and couple ground through PI-1 and PO-1 to the previously-floating side of detonators 2120, 2125, 2130 as well as to the actuation enable line AE-2 of deployment switch 1515. In one embodiment, applying positive power to deployment switch 1520 causes it to actuate and couple PI-2 to PO-2, which couples the device actuation line 1520 to the power input line of switch assembly 2105. At this point, in one embodiment, the switch contact S1-b of the switch assemblies 2105, 2110, 2115 are closed so the device actuation line is coupled to the attach input ("A") of switch assembly 2115. In one embodiment, application of power in a positive-negative-positive sequence to the device actuation line will fire detonator 2130 and attach switch assembly 2110. Then, in one embodiment, application of power in a negative-positive-negative sequence to the device actuation line will fire detonator 2125 and attach switch assembly 2110. In one embodiment, application of power in a positive-negative-positive sequence to the device actuation line will fire detonator 2120. In one embodiment, this alternating sequence of power applications provides an additional safeguard against accidental early or unintended actuation of one of the detonators 2120, 2125, 2130. In one embodiment, this alternating sequence of power applications is applied in other scenarios, not involving detonators, to prevent accidental early or unintended actuation of a device, such as transient-sensitive device 1505.

In one embodiment, the deployment switches isolate non-power lines, such as signal lines. In that way, in one embodiment, a signal input to a transient-sensitive device can be isolated from transients that might appear on the signal line.

Figure 23:
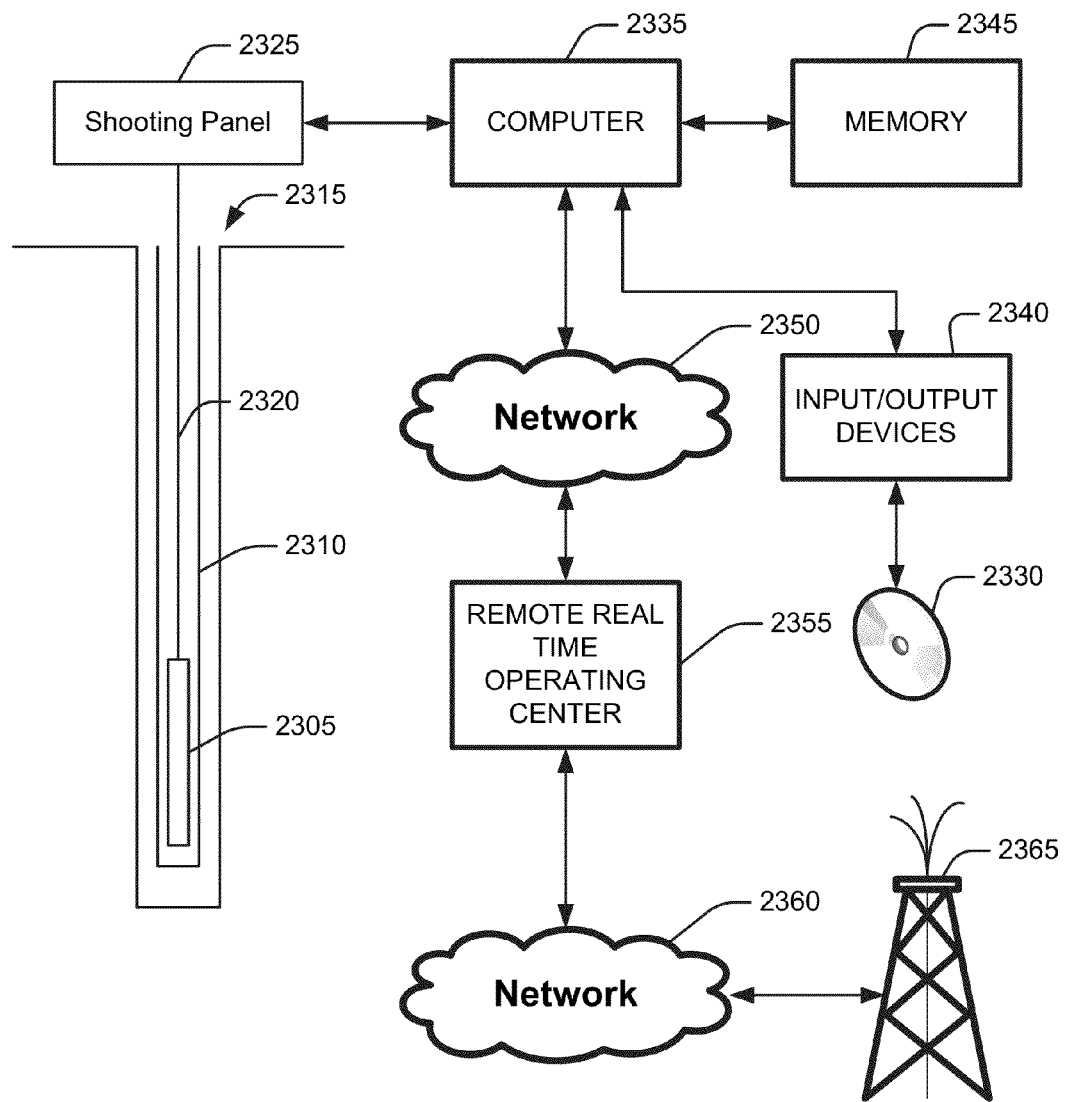
FIG. 23 illustrates an environment in which such a system might be used.

In one embodiment, shown in FIG. 23, the transient-sensitive device 1505 and the other devices shown in FIGS. 15-22, i.e. devices 1575 and 1580, are included in a downhole package 2305, such as a perforation apparatus, suspended within a casing 2310 within a borehole 2315 by a cable 2320 that includes the device actuation line 1520. In one embodiment, a shooting panel 2325 produces the positive and negative power signals that are transmitted along the device actuation line 1520 to produce the state changes described above. In one embodiment, the shooting panel 2325 is manually controlled through, for example, a set of switches.

In one embodiment, the shooting panel is controlled by software in the form of a computer program on a computer readable media 2330, such as a CD or DVD, as shown in FIG. 23. In one embodiment, a computer 2335, reads the computer program from the computer readable media 2330 through an input/output device 2340 and stores it in a memory 2345 where it is prepared for execution through compiling and linking, if necessary, and then executed. In one embodiment, the system accepts inputs through an input/output device 2340, such as a keyboard, and provides outputs through an input/output device 2340, such as a monitor or printer. In one embodiment, the system stores the results of calculations in memory 2345 or modifies such calculations that already exist in memory 2345.

In one embodiment, the results of calculations that reside in memory 2345 are made available through a network 2350 to a remote real time operating center 2355. In one embodiment, the remote real time operating center 2355 makes the results of calculations available through a network 2360 to help in the planning of oil wells 2365 or in the drilling of oil wells 2365.

In one embodiment, the transient-sensitive device 1505 is a RED® Perforating Detonator sold by Halliburton Energy Services, Inc. In one embodiment, the transient-sensitive device 1505 is a device that is sensitive to transients on its power inputs.

The word "coupled" herein means a direct connection or an indirect connection.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
    a first switch comprising:
        a first-switch spring having a first state in which it is held in tension and a second state in which it is not held in tension;
        a normally open set of contacts, 1-A-1 and 1-A-2, that are electrically disconnected when the first-switch spring is in the first state and electrically connected when the first-switch spring is in the second state;
        a first-switch restraining element for keeping the first-switch spring in the first state, wherein the first-switch restraining element has a first side and a second side and wherein the first-switch restraining element is permanently collapsible to change the first-switch spring from the first state to the second state when a first-switch actuating voltage is applied across the first side and the second side of the first-switch restraining element;
    a first-switch actuation circuit comprising:
        a first-switch actuation line coupled to the first side of the first-switch restraining element, and
        a first-switch actuation enable line coupled to the second side of the first-switch restraining element;
    a first-switch firing circuit comprising:
        a first-switch power input line coupled to contact 1-A-1,
        a first-switch power output line coupled to contact 1-A-2, and
        a first-switch enable line coupled to contact 1-A-2;

a second switch comprising:
  a second-switch spring having a first state in which it is held in tension and a second state in which it is not held in tension;
  a normally open set of contacts, 2-A-1 and 2-A-2, that are electrically disconnected when the second-switch spring is in the first state and electrically connected when the second-switch spring is in the second state;
  a second-switch restraining element for keeping the second-switch spring in the first state, wherein the second-switch restraining element has a first side and a second side and wherein the second-switch restraining element is permanently collapsible to change the state of the second-switch spring from the first state to the second state when a second-switch actuating voltage is applied across the first side and the second side of the second-switch restraining element;
  a second-switch actuation circuit comprising:
    a second-switch actuation line coupled to the first side of the second-switch restraining element, and
    a second-switch actuation enable line coupled to the second side of the second-switch restraining element; and
  a second-switch firing circuit comprising:
    a second-switch power input line coupled to contact 2-A-1,
    a second-switch power output line coupled to contact 2-A-2, and
    a second-switch actuation enable line coupled to the first-switch enable line.

2. The apparatus of claim 1 wherein the second-switch actuation enable line is couplable to the first-switch enable line through a third switch.

3. The apparatus of claim 1 wherein the second-switch actuation enable line is couplable to the first-switch enable line through a normally open set of contacts on the first switch that are open before the first switch is actuated and closed after the first switch is actuated.

4. The apparatus of claim 1 wherein the second-switch actuation line is couplable to a device actuation line through a normally open set of contacts of the first switch that are open before the first switch is actuated and closed after the first switch is actuated.

5. The apparatus of claim 1 wherein the second-switch power output line is shorted to the first-switch power output line through a normally closed set of contacts on the first switch wherein the short is removable when the state of the first switch spring is changed from the first state to the second state.

6. The apparatus of claim 1 further comprising:
a first-switch-actuation-circuit diode having a first-polarity terminal and a second-polarity terminal, wherein
  the first-switch actuation line is coupled to the first-polarity terminal of the first-switch-actuation-circuit diode, and
  the second-polarity terminal of the first-switch-actuation-circuit diode is coupled to the first side of the first-switch restraining element;
a second-switch-actuation-circuit diode having a first-polarity terminal and a second-polarity terminal, wherein
  the first-polarity terminal of the first-switch-actuation-circuit diode is the same polarity as the first-polarity terminal of the second-switch-actuation-circuit diode,
  the second-polarity terminal of the first-switch-actuation-circuit diode is the same polarity as the second-polarity terminal of the second-switch-actuation diode,
  the second-switch actuation line is coupled to the second-polarity terminal of the second-switch-actuation-circuit diode, and
  the first-polarity terminal of the of the second-switch-actuation-circuit diode is coupled to the first side of the second-switch restraining element.

7. The apparatus of claim 6 wherein:
the first-polarity terminal of the first-switch-actuation-circuit diode is the anode of the first-switch-actuation-circuit diode,
the second-polarity terminal of the first-switch-actuation-circuit diode is the cathode of the first-switch-actuation-circuit diode,
the first-polarity terminal of the second-switch-actuation-circuit diode is the anode of the first-switch-actuation-circuit diode, and
the second-polarity terminal of the second-switch-actuation-circuit diode is the cathode of the first-switch-actuation-circuit diode.

8. The apparatus of claim 1 further comprising:
a first-switch-actuation-circuit diode having a first-polarity terminal and a second-polarity terminal, wherein
  the first-switch actuation line is coupled to the first-polarity terminal of the first-switch-actuation-circuit diode, and
  the second-polarity terminal of the of the first-switch-actuation-circuit diode is coupled to the first side of the first-switch restraining element; and
a first-switch-firing-circuit diode having a first-polarity terminal and a second-polarity terminal, wherein
  the first-switch power input line is coupled to the first-polarity terminal of the first-switch-firing-circuit diode, and
  the second-polarity terminal of the of the first-switch-firing-circuit diode is coupled to the first side of the first-switch restraining element.

9. The apparatus of claim 8 wherein:
the first-polarity terminal of the first-switch-actuation-circuit diode is the same polarity as the first-polarity terminal of the first-switch-firing-circuit diode, and
the second-polarity terminal of the first-switch-actuation-circuit diode is the same polarity as the second-polarity terminal of the first-switch-firing-circuit diode.

10. The apparatus of claim 8 wherein:
the first-polarity terminal of the first-switch-actuation-circuit diode is the same polarity as the second-polarity terminal of the first-switch-firing-circuit diode, and
the second-polarity terminal of the first-switch-actuation-circuit diode is the same polarity as the first-polarity terminal of the first-switch-firing-circuit diode.

11. The apparatus of claim 1 wherein the second-switch actuation line is connected to the second-switch power input line.

12. The apparatus of claim 1 wherein the first-switch actuation line is connected to the second-switch actuation line.

13. An apparatus comprising:
a first switch comprising:
  a first-switch spring having a first state in which it is held in tension and a second state in which it is not held in tension;
  a normally open set of contacts, 1-A-1 and 1-A-2, that are electrically disconnected when the first-switch spring is in the first state and electrically connected when the first-switch spring is in the second state;

a first-switch restraining element for keeping the first-switch spring in the first state, wherein the first-switch restraining element has a first side and a second side and wherein the first-switch restraining element is permanently collapsible to change the first-switch spring from the first state to the second state when a first-switch actuating voltage is applied across the first side and the second side of the first-switch restraining element;

a first-switch actuation circuit comprising:
a first-switch actuation line coupled to the first side of the first-switch restraining element, and
a first-switch actuation enable line coupled to the second side of the first-switch restraining element;

a first-switch firing circuit comprising:
a first-switch power input line coupled to contact 1-A-1,
a first-switch power output line coupled to contact 1-A-2, and
a first-switch enable line coupled to contact 1-A-2;

a second switch comprising:
a second-switch spring having a first state in which it is held in tension and a second state in which it is not held in tension;
a normally open set of contacts, 2-A-1 and 2-A-2, that are electrically disconnected when the second-switch spring is in the first state and electrically connected when the second-switch spring is in the second state;
a second-switch restraining element for keeping the second-switch spring in the first state, wherein the second-switch restraining element has a first side and a second side and wherein the second-switch restraining element is permanently collapsible to change the state of the second-switch spring from the first state to the second state when a second-switch actuating voltage is applied across the first side and the second side of the second-switch restraining element;

a second-switch actuation circuit comprising:
a second-switch actuation line coupled to the first side of the second-switch restraining element, and
a second-switch actuation enable line coupled to the second side of the second-switch restraining element;

a second-switch firing circuit comprising:
a second-switch power input line coupled to contact 2-A-1,
a second-switch power output line coupled to contact 2-A-2, and
a second-switch actuation enable line coupled to the first-switch enable line;

a device comprising:
a first power input coupled to the first-switch power output line, and
a second power input coupled to the second-switch power output line;

wherein:
the first-switch power input line is coupled to a first terminal of a power source, and
the first-switch actuation line, the second-switch actuation line, and the second-switch power input line are coupled to a device actuation line which is couplable to a second terminal of the power source.

14. The apparatus of claim 13 wherein:
the first terminal of the power source is at ground, and
the second terminal of the power source is at a voltage that is selectable between a positive voltage and a negative voltage.

15. The apparatus of claim 13 wherein:
the first terminal of the power source is at a voltage that is selectable between a positive voltage and a negative voltage, and
the second terminal of the power source is at ground.

16. A method comprising:
coupling a first-switch enable line on a first switch to a second-switch actuation enable line on a second switch;
coupling a second-switch actuation line on the second switch to a first-switch actuation line on the first switch;
coupling a second-switch power input line on the second switch to the first-switch actuation line on the first switch;
applying a first-switch-actuation-polarity power to the first-switch actuation line, a first polarity of the first-switch-actuation-polarity power being defined relative to a first voltage on a first-switch-actuation-enable line, causing the first switch to actuate and remain actuated after the applied first-switch-actuation-polarity power is removed,
wherein actuating the first switch couples:
a first-switch power input line to a first-switch power output line; and
the first-switch power input line to the first-switch enable line; and
applying second-switch-actuation polarity power to the second-switch actuation line, a second polarity of the second-switch actuation polarity power being defined relative to a voltage on the second-switch actuation enable line and being opposite of the first polarity of the first-switch-actuation-polarity power, causing the second switch to actuate and remain actuated after the applied second-switch-actuation-polarity power is removed, and
wherein actuating the second switch couples the second-switch power input line to a second-switch power output line.

17. The method of claim 16 further comprising:
coupling the first-switch actuation line on the first switch to a main-device-actuation line;
coupling the first-switch power input line on the first switch to a first source;
coupling the first-switch power output line on the first switch to a first terminal on a device; and
coupling the second-switch power output line on the second switch to a second terminal on the device
wherein the device operates when the first power terminal on the device is coupled to a first voltage and the second power terminal on the device is coupled to a second voltage.

18. The method of claim 16 further comprising:
coupling the second-switch actuation enable line to the first-switch enable line through a third switch.

19. The method of claim 16 further comprising:
coupling the second-switch actuation line to a main-device-actuation line through a normally open set of contacts of the first switch that are open before the first switch is actuated and closed after the first switch is actuated.

20. The method of claim 16 further comprising:
shorting the first power terminal of the device to the second power terminal of the device through a normally closed set of contacts of the first switch that are closed before the first switch is actuated and open after the first switch is actuated.

* * * * *